US009065527B2

(12) United States Patent
Hoshino et al.

(10) Patent No.: US 9,065,527 B2
(45) Date of Patent: Jun. 23, 2015

(54) RELAY STATION, BASE STATION AND COMMUNICATION METHOD

(75) Inventors: Masayuki Hoshino, Kanagawa (JP); Hidetoshi Suzuki, Kanagawa (JP); Ayako Horiuchi, Kanagawa (JP); Daichi Imamura, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 86 days.

(21) Appl. No.: 13/819,292

(22) PCT Filed: Feb. 8, 2012

(86) PCT No.: PCT/JP2012/000830
§ 371 (c)(1),
(2), (4) Date: Feb. 26, 2013

(87) PCT Pub. No.: WO2012/114666
PCT Pub. Date: Aug. 30, 2012

(65) Prior Publication Data
US 2013/0163507 A1 Jun. 27, 2013

(30) Foreign Application Priority Data
Feb. 22, 2011 (JP) .................. 2011-035591

(51) Int. Cl.
H04W 88/04 (2009.01)
H04W 72/04 (2009.01)
(Continued)

(52) U.S. Cl.
CPC ............. *H04B 7/155* (2013.01); *H04W 88/04* (2013.01); *H04L 27/28* (2013.01); *H04W 72/04* (2013.01)

(58) Field of Classification Search
USPC ........................................................ 370/315
See application file for complete search history.

(56) References Cited

U.S. PATENT DOCUMENTS 8,837,347 B2 * 9/2014 Noh et al. ..................... 370/315
2010/0322146 A1 * 12/2010 Liu et al. ...................... 370/315

FOREIGN PATENT DOCUMENTS

CN 101964676 A 2/2011
WO 2010/124716 A1 11/2010
WO WO 2011/009371 A1 * 1/2011

OTHER PUBLICATIONS

3rd Generation Partnership Project; Technical Specification Group Radio Access Network; Evolved Universal Terrestrial Radio Access (E-UTRA); Further advancements for E-UTRA physical layer aspects (Release 9), Technical Specification, 3GPP TR 36.814 V9.0.0, Mar. 2010.*

(Continued)

*Primary Examiner* — Chi H Pham
*Assistant Examiner* — Shailendra Kumar
(74) *Attorney, Agent, or Firm* — Seed IP Law Group PLLC

(57) ABSTRACT

Provided is a relay station that is capable of improving PDSCH channel estimation accuracy, even in a case where a DL grant is provided that gives instructions for downlink data allocation for R-PDCCH. In this device, a signal separation unit (203) receives, of the control information and data and reference signals sent from a base station (100), the reference signals disposed in a first region and a second region within a pre-coding RB group (PRG) comprising one or more PRBs of the plurality of PRBs constituting a divided frequency region; the control information disposed in the first region; and the data disposed in the second region. A demodulation unit (204) demodulates the data on the basis of the reference signals. The demodulation unit (204) demodulates the data using the reference signals disposed in the second region.

11 Claims, 19 Drawing Sheets

(51) Int. Cl.
H04L 27/28 (2006.01)
H04B 7/155 (2006.01)

(56) References Cited

OTHER PUBLICATIONS

3rd Generation Partnership Project; Technical Specification Group Radio Access Network; Evolved Universal Terrestrial Radio Access (E-UTRA); Physical layer for relaying operation (Release 10), Techical Specification, 3GPP TS 36.216 V10.0.0, Sep. 2010.*
Panasonic, Resource allocation schemes of R-PDCCH, 3GPP TSG RAN WG1 Meeting #62bis, R1-105499, Xi'an, China, Oct. 11-15, 2010.*
Panasonic,R-PDCCH placement, 3GPP TSG RAN WG1 Meeting #61, R1-102881, Montreal, Canada, May 10-14, 2010.*
Md. Masud Rana, Jinsang Kim and Won-Kyung Cho, Low Complexity Downlink Channel Estimation for LTE Systems, Advanced Communicatins Technology (ICACT) 2010, The Twelth International Comunications Conference on Phoenix Park, vol. 2, pp. 1198-1202, Feb. 7-10, 2010.*
3GPP TS 36.213 V10.0.1, "3rd Generation Partnership Project; Technical Specification Group Radio Access Network; Evolved Universal Terrestrial Radio Access (E-UTRA); Physical layer procedures (Release 10)," Dec. 2010, 98 pages.
3GPP TS 36.216 V10.1.0, "3rd Generation Partnership Project; Technical Specification Group Radio Access Network; Evolved Universal Terrestrial Radio Access (E-UTRA); Physical layer for relaying operation (Release 10)," Dec. 2010, 15 pages.
Panasonic, "R-PDCCH placement," R1-102881, 3GPP TSG RAN WG1 Meeting #61, Agenda Item: 6.6.1.2 Backhaul control channel design, Montreal, Canada, May 10-14, 2010, 5 pages.
Panasonic, "Resource allocation schemes of R-PDCCH," R1-105499, 3GPP TSG RAN WG1 Meeting #62bis, Agenda Item: 6.6.1 R-PDCCH search space design, Xi'an, China, Oct. 11-15, 2010, 7 pages.
International Search Report dated May 22, 2012, for corresponding International Application No. PCT/JP2012/000830, 2 pages.
English translation of Chinese Search Report dated Dec. 2, 2014, for corresponding CN Application No. 201280001967.0, 2 pages.

* cited by examiner

| NUMBER OF RBs IN SYSTEM BAND | PRG size | RBG size |
|---|---|---|
| ≤10 RBs | 1RB | 1RB |
| 11–26 RBs | 2RBs | 2RBs |
| 27–63 RBs | 3RBs | 3RBs |
| 64–110 RBs | 2RBs | 4RBs |

FIG. 5

RELAY STATION, BASE STATION AND COMMUNICATION METHOD

TECHNICAL FIELD

The claimed invention relates to a relay station, a base station, and a communication method.

BACKGROUND ART

In recent years, it has become common to transmit not only speech data but also a large amount of data such as still image data and moving image data along with the adoption of multimedia information in cellular mobile communication systems. In order to achieve transmission of a large amount of data, studies have been actively carried out on technologies that achieve a high data rate using a high-frequency radio band.

When a high-frequency radio band is utilized, however, attenuation increases as the transmission distance increases, although a higher data rate can be expected with a short distance. Accordingly, the coverage area of a radio communication base station apparatus (hereinafter, abbreviated as "base station" or "evolved Node B (eNB)") decreases when a mobile communication system using a high-frequency radio band is actually put into operation. Thus, more base stations need to be installed in this case. The installation of base stations involves reasonable costs, however. For this reason, there has been a high demand for a technique that provides a communication service using a high-frequency radio band, while limiting an increase in the number of base stations.

In order to meet such a demand, studies have been carried out on a relay transmission technique in which a radio communication relay station apparatus (hereinafter, abbreviated as "relay station" or "relay node (RN)") is installed between a base station and a radio communication mobile station apparatus (hereinafter, abbreviated as "mobile station" or "user equipment (UE)") to perform communication between the base station and mobile station via the relay station for the purpose of increasing the coverage area of each base station. The use of relay technique allows a mobile station not capable of directly communicating with a base station to communicate with the base station via a relay station. For example, relay station 20 is installed between base station 10 and mobile station 30, and base station 10 and mobile station 30 communicate with each other via relay station 20 in a radio relay system illustrated in FIGS. 1A and 1B.

(TD Relay)

The Long Term Evolution Advanced (LTE-A) system for which the introduction of relay technique has been studied is required to maintain compatibility with Long Term Evolution (LTE) in terms of a smooth transition from and coexistence with LTE. For this reason, mutual compatibility with LTE is required for the relay technique as well. In the LTE-A system, studies have been carried out on configuring MBMS single frequency network (MBSFN) subframes for downlink (hereinafter, abbreviated as "DL") transmission from a base station to a relay station in order to achieve mutual compatibility with LTE.

The base station and mobile station communicate with each other via the relay station herein using time-division relay (i.e., TD relay). FIGS. 1A and 1B are diagrams provided for describing the TD relay. FIG. 1A is a conceptual diagram for describing downlink TD relay, and FIG. 1B is a conceptual diagram for describing uplink TD relay. In the TD relay (also referred to as "half duplex relay" or "Type 1 relay"), transmission from a base station to a relay station and transmission from the relay station to a mobile station are divided in time.

As illustrated in FIG. 1B, transmission is performed from mobile station 30 to relay station 20 on the access link in subframe #2 while communication from relay station 20 to base station 10 is performed on the backhaul link in subframe #3 in uplink. In subframe #4, transmission is performed from mobile station 30 to relay station 20 again.

Likewise, as illustrated in FIG. 1A, transmission is performed from relay station 20 to mobile station 30 on the access link in subframe #2 while communication is performed from base station 10 to relay station 20 on the backhaul link in subframe #3 in downlink. In subframe #4, transmission is performed from relay station 20 to mobile station 30 again.

As described above, dividing communication into the backhaul communication and access link communication of relay station 20 in the time domain enables dividing the time into transmission time and reception time for relay station 20. Accordingly, relay station 20 can relay signals without being affected by coupling wave between a transmission antenna and a reception antenna.

MBSFN subframes are configured for the access links in downlink. "MBSFN subframes" are subframes defined for transmitting multimedia broadcast multicast service (MBMS) data. LTE terminals are configured not to use reference signals in MBSFN subframes.

In this respect, there has been proposed a technique that configures access link subframes that overlap a backhaul link subframe used by a relay station to communicate with a base station, for MBSFN subframes in LTE-A. This proposal allows LTE terminals to avoid erroneously detecting reference signals.

FIG. 2 illustrates an example of control signals and a data assignment state for each of base station 10, relay station 20, and mobile station 30 when subframes of the LTE system are used. As illustrated in FIG. 2, downlink control signals transmitted or received in each station are mapped in a control signal region in the top part of a subframe (hereinafter, referred to as "Physical Downlink Control Channel (PDCCH) region"). More specifically, both of base station 10 and relay station 20 transmit control signals in the PDCCH region in the top part of the subframe. With reference to relay station 20, downlink control signals (PDCCH) have to be transmitted to mobile station 30 even in an MBSFN subframe. Accordingly, relay station 20 transmits downlink control signals to mobile station 30 and then switches the processing to reception processing to prepare for receiving signals transmitted from base station 10. Base station 10, however, transmits downlink control signals intended for relay station 20 at the time relay station 20 transmits downlink control signals to mobile station 30. For this reason, relay station 20 cannot receive the downlink control signals transmitted from base station 10. In order to avoid such inconvenience, studies have been carried out on providing a region in which downlink control signals for relay stations are mapped (i.e., relay PDCCH (R-PDCCH) region) in a data region as illustrated in FIG. 2 in LTE-A.

(Control Signals)

In LTE, a base station transmits control signals to a mobile station using a downlink control channel such as PDCCH, for example. PDCCH includes DL grant indicating DL data (i.e., Physical Downlink Shared Channel (PDSCH)) assignment and UL grant indicating UL data (i.e., Physical Uplink Shared Channel (PUSCH)) assignment.

In LTE-A, studies have been carried out on including DL grant and UL grant in R-PDCCH. In addition, studies have been carried out on mapping the DL grant in the first slot and the UL grant in the second slot for R-PDCCH (see, Non-Patent Literature (hereinafter, referred to as "NPL") 1). Mapping the DL grant only in the first slot reduces a delay in decoding the DL grant and allows relay stations to prepare for ACK/NACK transmission for DL data (e.g., transmission performed in the fourth subframe following the reception of DL grant in FDD).

In addition, studies have been carried out on allocating, for each relay station, a different physical layer resource block (i.e., physical resource block (PRB)) on which an R-PDCCH region is provided as illustrated in FIG. 3. In FIG. 3, the vertical axis indicates frequency and the horizontal axis indicates time. In FIG. 3, the R-PDCCH for relay station RN 1 is mapped on PRB #0 and the R-PDCCH for relay station RN 2 is mapped on PRBs #6 and 7 in the same subframe, for example. Each relay station finds the downlink control signals intended for the relay station by performing blind-decoding on downlink control signals transmitted using an R-PDCCH region from a base station within a resource region indicated using higher layer signaling from the base station (i.e., R-PDCCH search space).

(DM-RS Arrangement)

In LTE-A, studies have been carried out on introduction of demodulation reference signals (DM-RS) mainly for the purpose of directing a different beam for each mobile station and relay station. DM-RS is expressed by a combination of a plurality of ports defined as mutually orthogonal resources (e.g., ports 7, 8, 9, and 10) and scrambling IDs (SC-ID: SC-IDs 0 and 1) defined by randomization using non-orthogonal but different sequences. When DM-RS is used for channel estimation, a base station can use an optional beam by applying the same beam (i.e., same precoding) to DM-RS and control signals and data signals that pertain to the DM-RS.

FIGS. 4A and 4B are provided for describing mapping of DM-RS used for channel estimation. In FIGS. 4A and B, the vertical axis indicates frequency and the horizontal axis indicates time. Normally, DM-RS is mapped at the last two symbols of each slot (first slot and second slot) as illustrated in FIG. 4A. As illustrated in FIG. 4A, DM-RS (referred to as DM-RS ports 7 and 8 in FIGS. 4A and B) is mapped at OFDM symbols #5 and #6 as well as OFDM symbols #11 and #12 in a normal subframe. In addition, as illustrated in FIG. 4B, studies have been carried out on signal arrangement without using the last symbol of the second slot (i.e., OFDM symbol #12) in the abovementioned TD relay for a case where UL data assignment is present in the immediately following subframe and the restrictions on signal transmission timing from a relay station to a base station are stringent including a case where the distance between the relay station and base station is long, for example. In FIG. 4B, DM-RS is mapped only in first slot without being mapped in the second slot for signal arrangement without using OFDM symbol #12.

In addition, since relay stations perform R-PDCCH blind-decoding as described above, the DM-RS used on R-PDCCH is fixed to port 7 and SC-ID=0, for example. Thus, each relay station can omit blind-decoding for ports other than port 7 and SC-IDs other than SC-ID=0, thereby reducing the number of blind-decoding attempts. In this manner, a simplification of the processing is achieved.

On the other hand, regarding PDSCH, each base station can explicitly report the port used for PDSCH using DL grant. Thus, each base station can perform a Single User Multiple-Input Multiple-Output (SU-MIMO) operation to transmit PDSCH intended for the same relay station using a plurality of beams, or a Multi User-MIMO (MU-MIMO) operation to transmit PDSCHs intended for a plurality of relay stations using different beams, respectively.

Moreover, since no other signals are transmitted in the region of the R-PDCCH region in which DM-RS is transmitted (hereinafter, referred to as "DL grant region"), rank-1 transmission is used for DL grant regardless of the number of transmission beams for PDSCH (hereinafter, referred to as "rank"). For this reason, the accuracy in detecting DL grants in each base station can be improved by application of power boost that allocates all the power assigned to the resource on which DL grant is mapped to DM-RS and DL grant.

(PRB Bundling)

In addition, studies have been carried out on PRB bundling as a technique for improving the accuracy of channel estimation. PRB bundling is a technique that uses the same precoding for a plurality of PRBs adjacent to each other when a different beam is directed to each relay station and mobile station using DM-RS, thereby improving the accuracy of channel estimation (see, section 7.1.6.5 of NPL 2, for example). In PRB bundling, the receiving side performs averaging or interpolation of channel estimation values calculated using DM-RS mapped on RBs, in units of sets of adjacent PRBs to which the same precoding is applied (hereinafter, referred to as "Precoding Resource Block Groups (PRGs)"), for example.

(PRG Size)

The number of adjacent PRBs to which the same precoding is applied is referred to as "Precoding Resource Block Group (PRG) size." The value configured for PRG size varies depending on the number of RBs included in the system bandwidth (hereinafter, referred to as "RBs"). FIG. 5 illustrates a correspondence between the number of RBs in the system band, the PRG size and RBG size (Resource Block Group size). The term "RBG" as used herein refers to a unit obtained by bundling one or more RBs. As illustrated in FIG. 5, the PRG size and RBG size are determined according to the number of RBs in the system band.

As the PRG size increases, the DM-RS to which the same precoding is applied increases. As a result, the reception performance with respect to DM-RS (e.g., Signal to Noise Ratio (SNR)) can be increased. Meanwhile, as the PRG size increases, the influence of frequency-selective fading is more likely to become uneven on each DM-RS, which in turn increases the possibility that the optimum beam is not configured even when the DM-RS is used. For this reason, even when the number of RBs in the system band is large, the PRG size is configured to be 2 or 3, considering a tradeoff between the abovementioned "effect of increasing the reception performance with respect to reference signals" and "influence of frequency-selective fading" as illustrated in FIG. 5.

(R-PDCCH Aggregation Size)

In addition, in order to adjust the coding rates of DL and UL grants according to the channel quality as in the case of PDCCH in LTE Release 8, studies have been carried out on preparing a plurality of aggregation sizes (may be referred to as "control channel element (CCE) aggregation size"). FIG. 6 is a conceptual diagram illustrating R-PDCCH aggregation sizes. In FIG. 6, each vertical axis indicates frequency and each horizontal axis indicates time. As illustrated in FIG. 6, as the R-PDCCH aggregation size is reduced from 8, 4, 2 to 1, the coding rate is increased. In other words, a smaller aggregation size is suitable when the channel quality between a base station and a relay station is good.

For example, a base station estimates the channel quality between the base station and a relay station and determines the R-PDCCH aggregation size and transmits signals in accordance with the determined aggregation size to the relay station. Meanwhile, the relay station is not previously informed of the aggregation size, which is changed for each subframe. In this respect, the relay station performs blind-decoding for each of the plurality of aggregation sizes (e.g., aggregation sizes 1, 2, 4, and 8 in FIG. 6).

CITATION LIST

Non-Patent Literatures

NPL 1
3GPP TS 36.216 v10.1.0, "Physical Layer for relaying operation (release 10)," December, 2010
NPL 2
3GPP TS 36.213 v10.0.1, "Physical Layer procedures (release 10)," December, 2010

SUMMARY OF INVENTION

Technical Problem

In an attempt to apply the PRB bundling described above to communication between a base station and a relay station without any modification, the following problems occur when DM-RS is mapped only in the first slot (see, FIG. 4B).

For example, DM-RS to be transmitted in an R-PDCCH region (i.e., first slot of PRB #0) in which DL grant is mapped has its rank=1 and becomes power-boosted signals in the PRG (PRBs #0 to #2) illustrated in FIG. 7. Meanwhile, as illustrated in FIG. 7, DM-RS to be transmitted in the data region in which PDSCH is transmitted (hereinafter, referred to as "PDSCH region") may become signals of a plurality of ranks as in the case of data signals (i.e., PDSCH signals).

During demodulation, the relay station averages the channel estimation value obtained using the DM-RS in the R-PDCCH region (i.e., DM-RS mapped on PRB #0) and the channel estimation value obtained using the DM-RS in the PDSCH regions (i.e., DM-RS mapped on PRBs #1 and #2) by application of PRB bundling to PRBs #0 to #2 illustrated in FIG. 7. The relay station herein performs channel estimation for PDSCH signals using the DM-RS to which the same rank (i.e., rank-2) as that for PDSCH signals, i.e., the same precoding is applied, in PRBs #1 and #2 as illustrated in FIG. 7. Thus, the accuracy of channel estimation for PDSCH signals is good in PRBs #1 and #2. On the other hand, since the rank is fixed (i.e., rank-1) in PRB #0, there is a possibility that the relay station may perform channel estimation for PDSCH signals using the DM-RS to which a rank different from that for PDSCH (i.e., different precoding) is applied. For this reason, it is likely that the accuracy of channel estimation for PDSCH signals in PRB #0 in which the DL grant indicating R-PDCCH downlink data assignment is mapped becomes poor compared to PRBs #1 and #2."

It is an object of the claimed invention to provide a relay station, a base station, and a communication method that are capable of improving the accuracy of channel estimation for PDSCH even when DL grant indicating R-PDCCH downlink data assignment is mapped therewith.

Solution to Problem

A relay station according to an aspect of the claimed invention in a communication system in which a base station and a mobile station communicate with each other via the relay station, includes: a receiving section that receives control information, data, and reference signals transmitted from the base station, the reference signals being mapped in a first region and a second region in a precoding resource block (RB) group (PRG) formed of one or more resource blocks (RBs) among a plurality of RBs formed by dividing a frequency region, the control information being mapped in the first region, and the data being mapped in the second region; and a demodulation section that demodulates the data on the basis of the reference signals, in which the demodulation section demodulates the data using the reference signals mapped in the second region.

A base station according to an aspect of the claimed invention in a communication system in which the base station and a mobile station communicate with each other via a relay station, includes: a mapping section that maps reference signals in a first region and a second region in a precoding resource block (RB) group (PRG), maps control information in the first region, and maps data in the second region, the PRG being formed of one or more resource blocks (RBs) among a plurality of RBs formed by dividing a frequency region; and a transmission section that transmits the mapped reference signals, control information and data to the relay station, in which the mapping section does not map the data in a region that is in the same frequency region as an RB forming the first region and that is subsequent to the RB in the time domain.

A communication method according to an aspect of the claimed invention in a communication system in which a base station and a mobile station communicate with each other via a relay station, includes: receiving, in the relay station, control information, data, and reference signals transmitted from the base station, the reference signals being mapped in a first region and a second region in a precoding resource block (RB) group (PRG) formed of one or more resource blocks (RBs) among a plurality of RBs formed by dividing a frequency region, the control information being mapped in the first region, and the data being mapped in the second region; and demodulating the data on the basis of the reference signals in the relay station, in which the relay station demodulates the data using the reference signals mapped in the second region.

Advantageous Effects of Invention

According to the claimed invention, it is possible to improve the accuracy of channel estimation for PDSCH even when DL grant indicating R-PDCCH downlink data assignment is mapped therewith.

BRIEF DESCRIPTION OF DRAWINGS

FIG. 5 is a diagram representing a correspondence between the number of RBs in a system band, the RPG size and RBG size;

DESCRIPTION OF EMBODIMENTS

Figure 1:
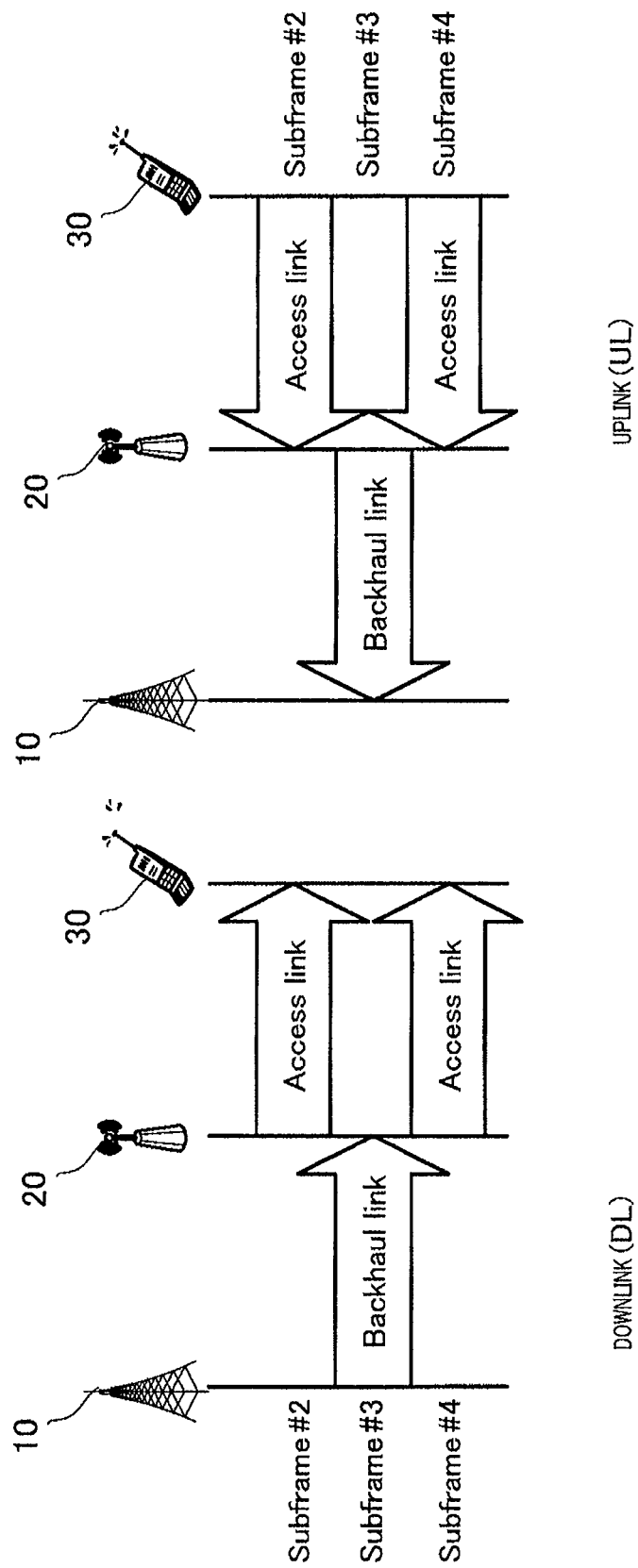
FIGS. 1A and 1B are diagrams provided for describing time-division relay (TD relay)
Figure 2:
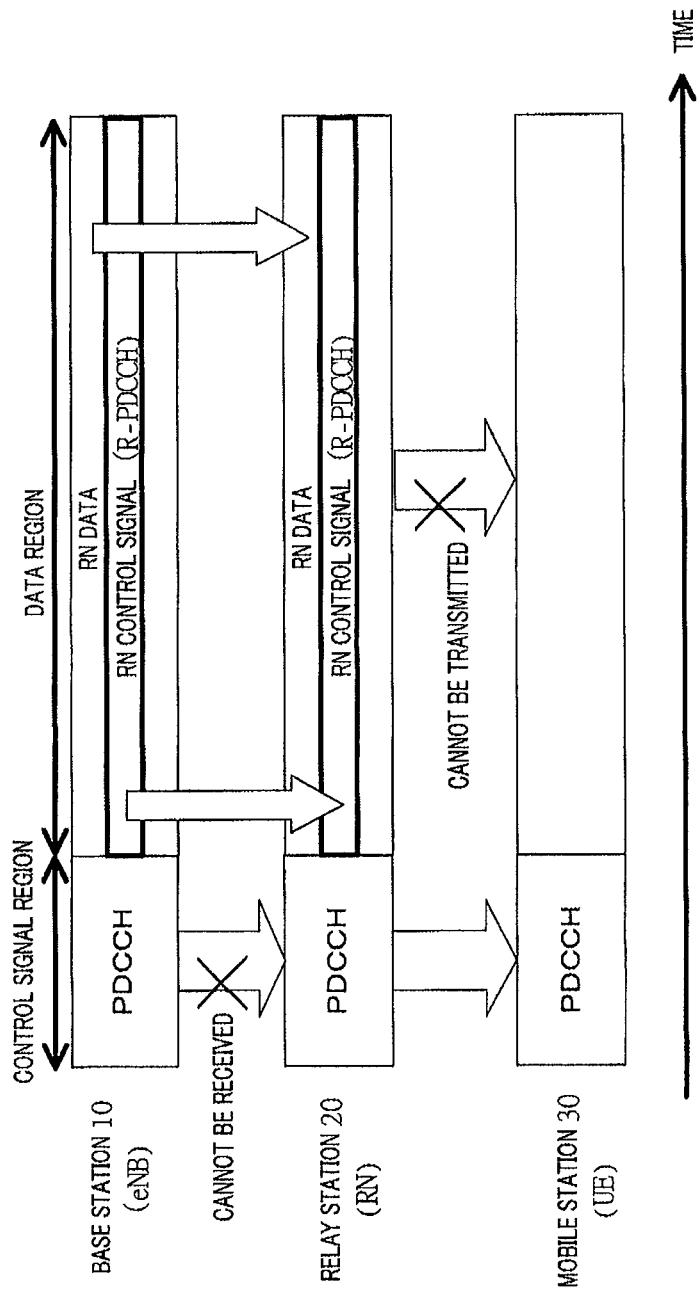
FIG. 2 is a diagram illustrating an example of control signals and a data assignment state for each of a base station, a relay station, and a mobile station.
Figure 3:
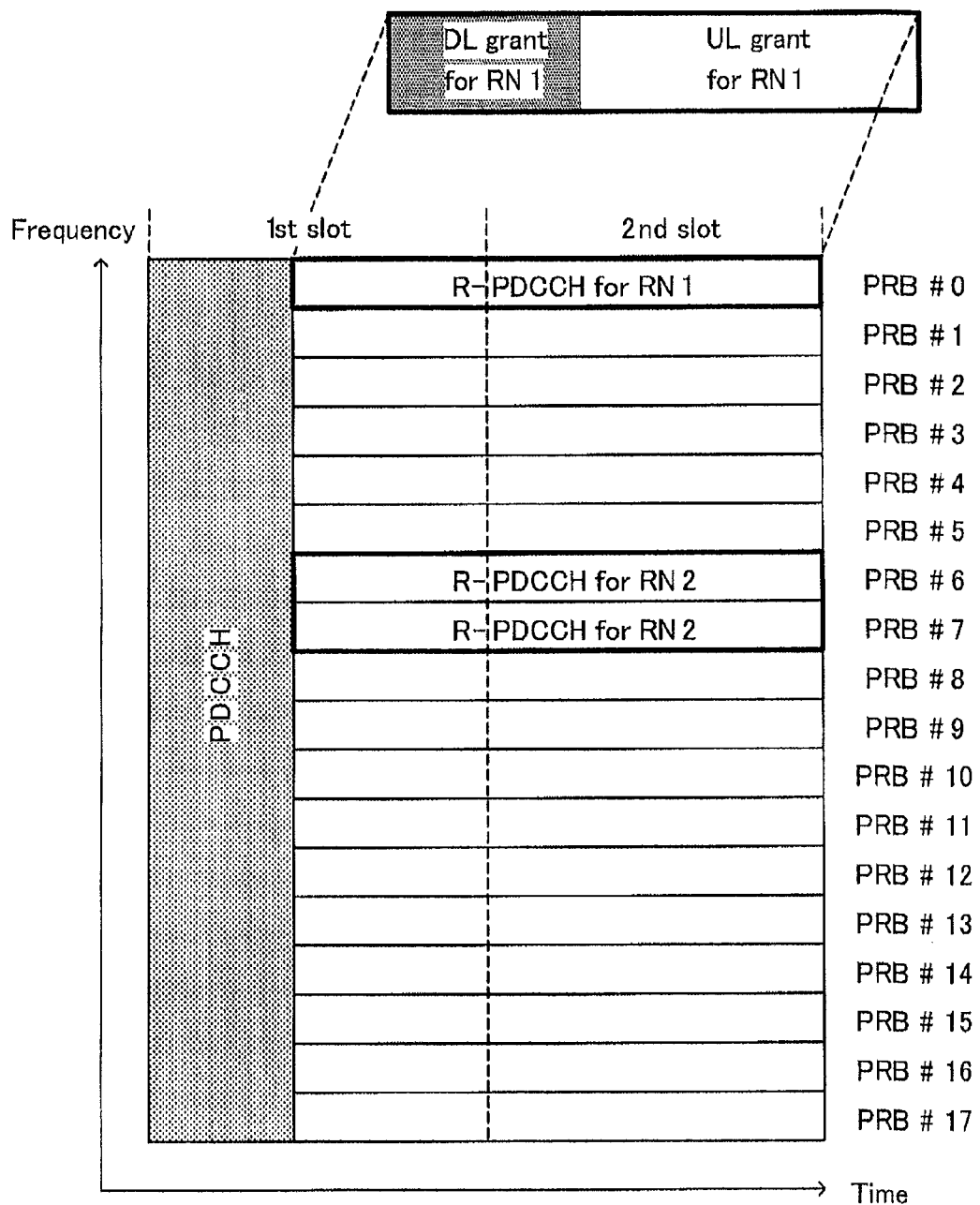
FIG. 3 is a diagram illustrating an R-PDCCH mapping example.

Hereinafter, embodiments of the claimed invention will be described in detail with reference to the accompanying drawings. Throughout the embodiments, the same elements are assigned the same reference numerals, and any duplicate description of the elements is omitted.

Figure 4A:
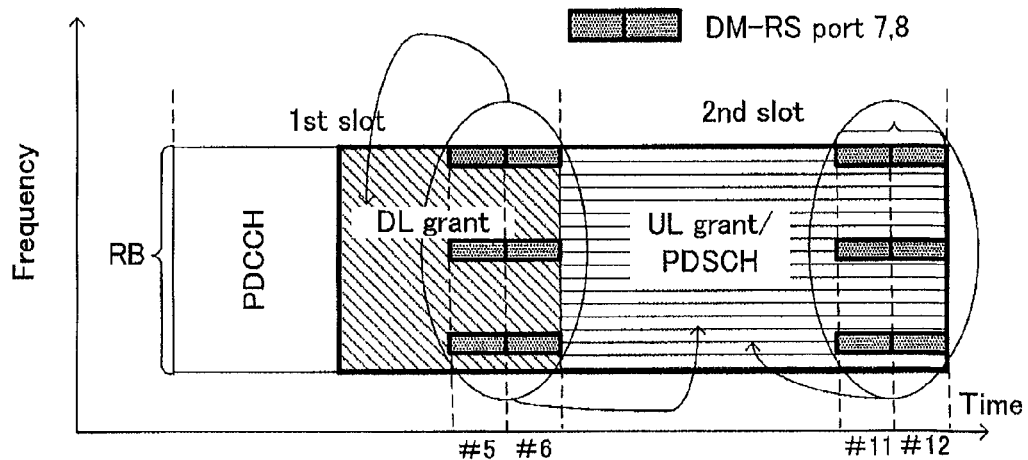
FIGS. 4A and 4B are diagrams each illustrating a DM-RS mapping example.
Figure 4B:
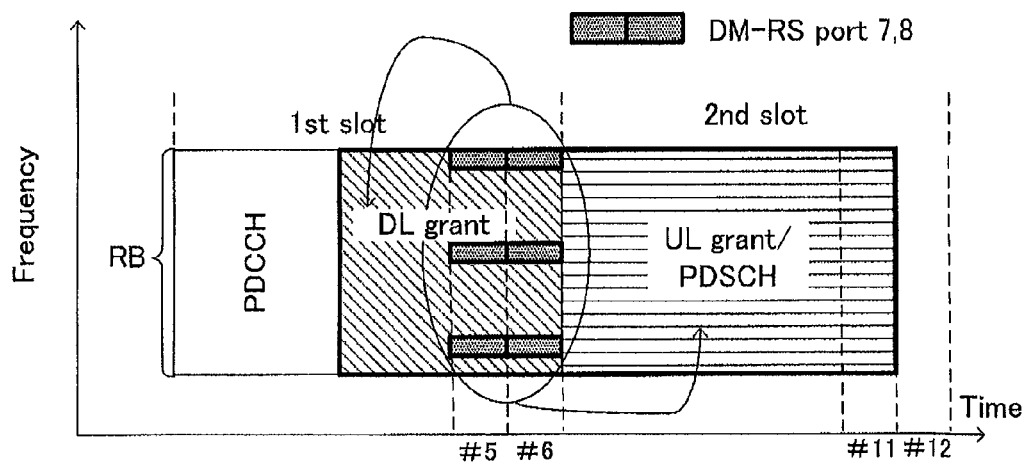

In each of the embodiments of the claimed invention, a description will be provided regarding signal arrangement on subframes without using the last symbol of the second slot (e.g., OFDM symbol #12 in FIG. 4B) as illustrated in FIG. 4B. More specifically, DM-RS is not mapped on the resources corresponding to the second slot in the R-PDCCH region and is only mapped on the resources corresponding to the first slot in the following description as illustrated in FIG. 4B.

Embodiment 1

Overview of Communication System

A communication system according to Embodiment 1 includes base station 100 and relay station 200. Base station 100 is an LTE-A base station, and relay station 200 is an LTE-A relay station, for example. In the communication system according to Embodiment 1, base station 100 and each mobile station communicate with each other via relay station 200.

In addition, in the communication system according to Embodiment 1, base station 100 transmits, using the same precoding, data signals (i.e., PDSCH signals) in units of precoding resource block groups (PRGs) each formed of one or more resource blocks among a plurality of resource blocks formed by dividing a frequency region (i.e., PRBs), the data signals being mapped on a plurality of adjacent resource blocks (PRBs). The plurality of adjacent PRBs including the data signals (PDSCH signals) to be transmitted using the same precoding form the same PRG. Meanwhile, base station 100 improves the accuracy in detecting DL grants by application of precoding different from that for PDSCH signals (i.e., rank-1 transmission) to only the first slot of the PRB in which DL grant is mapped.

Figure 8:
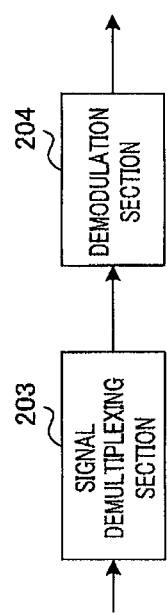
FIG. 8 is a main configuration diagram of a relay station according to Embodiment 1 of the claimed invention.

FIG. 8 is a main configuration diagram of relay station 200 according to Embodiment 1. In relay station 200, signal demultiplexing section 203 receives control information, data, and reference signals transmitted from base station 100, and demodulation section 204 demodulates the data on the basis of the reference signals. The reference signals from base station 100 are mapped in a first region and a second region in a precoding resource block group (PRG) formed of one or more PRBs among a plurality of PRBs formed by dividing a frequency region. The control information from base station 100 is mapped in the first region and the data is mapped in the second region. Demodulation section 204 herein demodulates the data using the reference signals mapped in the second region.

(Configuration of Base Station)

Figure 9:
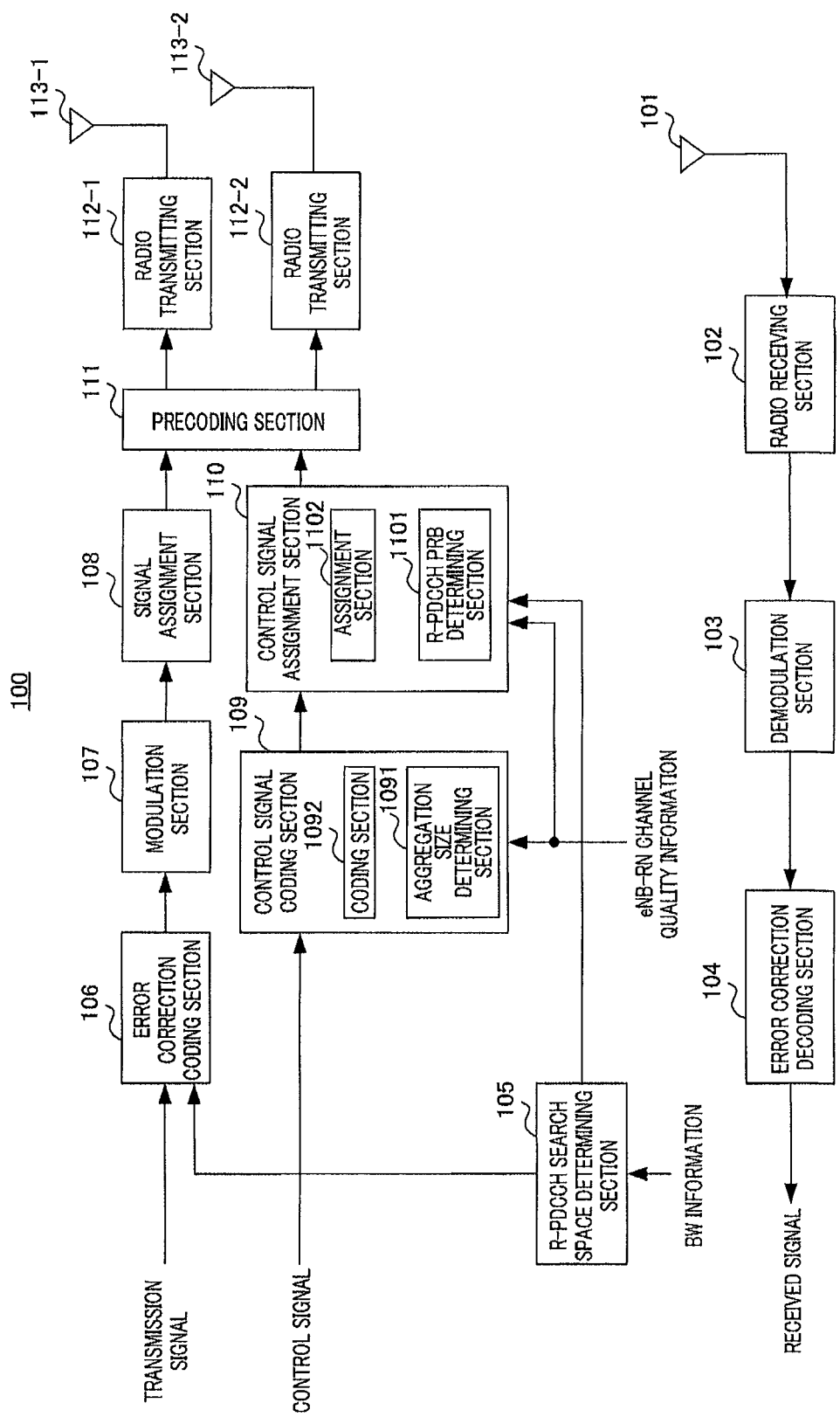
FIG. 9 is a block diagram illustrating a configuration of a base station according to Embodiment 1 of the claimed invention.

FIG. 9 is a block diagram illustrating a configuration of base station 100 according to Embodiment 1. In FIG. 9, base station 100 includes antenna 101, radio receiving section 102, demodulation section 103, error correction decoding section 104, R-PDCCH search space determining section 105, error correction coding section 106, modulation section 107, signal assignment section 108, control signal coding section 109, control signal assignment section 110, precoding section 111, radio transmitting sections 112-1 and 112-2, and antennas 113-1 and 113-2. In addition, signal assignment section 108 and control signal assignment section 110 serve as a mapping section that maps reference signals (such as DM-RS), control signals (such as DL grant), and data on the resources.

Radio receiving section 102 receives, via antenna 101, signals transmitted from relay station 200 or a mobile station, performs radio processing such as down-conversion on the signals and then outputs the processed signals to demodulation section 103.

Demodulation section 103 demodulates the signals received from radio receiving section 102 and outputs the demodulated signals to error correction decoding section 104.

Error correction decoding section 104 decodes the signals received from demodulation section 103 and outputs the resultant received signals.

R-PDCCH search space determining section 105 determines the PRB bundling size (i.e., PRG size) and RBG size on the basis of system bandwidth information indicating a system bandwidth (hereinafter, referred to as "BW information"). For example, R-PDCCH search space determining section 105 may determine the PRB bundling size (i.e., PRG size) and RBG size according to the correspondence illustrated in FIG. 5.

Moreover, R-PDCCH search space determining section 105 determines the search space (i.e., R-PDCCH search space) as a candidate for a resource region in which control signals for relay station 200 (i.e., R-PDCCH signals such as control information including DL grant and/or the like) are transmitted (i.e., R-PDCCH region). R-PDCCH search space determining section 105 outputs the search space information indicating the determined R-PDCCH search space to error correction coding section 106. In addition, R-PDCCH search space determining section 105 outputs the PRB bundling size, RBG size, and search space information to control signal assignment section 110. R-PDCCH search space determining section 105 generates search space information on a per RBG or PRB basis.

Error correction coding section 106 takes transmission signals (mainly data signals), and the R-PDCCH search space information received from R-PDCCH search space determining section 105, as input, and performs error correction coding on the input signals and outputs the resultant signals to modulation section 107.

Modulation section 107 modulates the signals received from error correction coding section 106 and outputs the modulated signals to signal assignment section 108.

Signal assignment section 108 assigns the signals received from modulation section 107 to a resource and outputs the signals to precoding section 111. For example, signal assignment section 108 maps the signals (including data signals) in a resource region indicated by the DL grant in the downlink control signals (i.e., R-PDCCH signals) intended for relay station 200. For example, signal assignment section 108 maps the transmission signals (including data signals (i.e., PDSCH signals)) in a resource region other than the resource region in which R-PDCCH signals (i.e., DL grant) are mapped in the PRBs forming the PRG (or RBG) for relay station 200.

Control signal coding section 109 encodes the control signals (R-PDCCH signals). The control signals include control information on the data signals (PDSCH signals) (such as DL grant, UL grant, the number of ranks, coding rates and modulation scheme), for example. Control signal coding section 109 employs a configuration including aggregation size determining section 1091 and coding section 1092.

Figure 6:
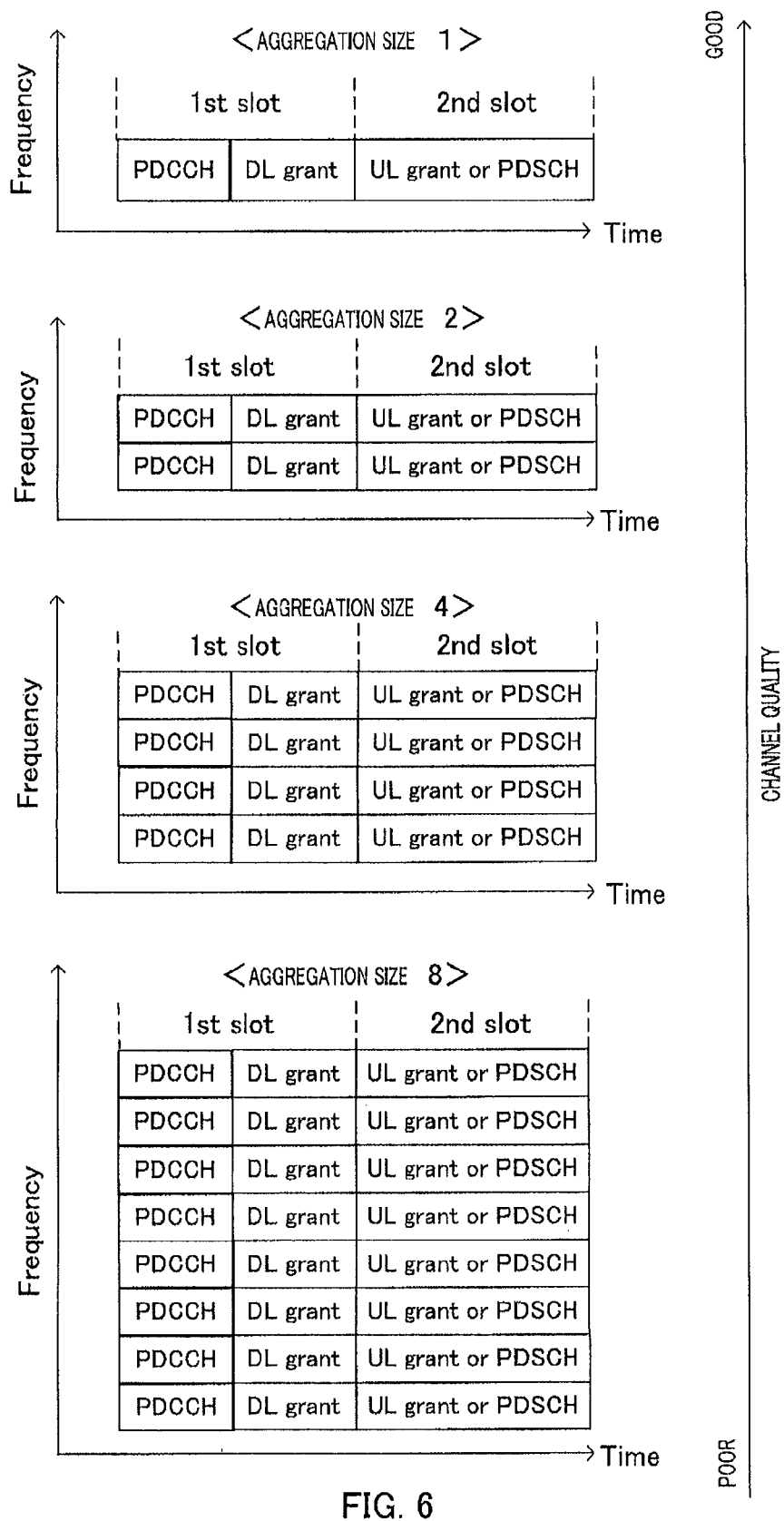
FIG. 6 is a diagram representing R-PDCCH aggregation sizes.

More specifically, aggregation size determining section 1091 determines the aggregation size for control signals according to eNB-RN channel quality information indicating the channel quality between base station 100 and relay station 200. As illustrated in FIG. 6, aggregation size determining section 1091 determines one of aggregation sizes=1, 2, 4, and 8 according to the eNB-RN channel quality information, for example. Aggregation size determining section 1091 outputs the determined aggregation size to coding section 1092 and R-PDCCH PRB determining section 1101.

Coding section 1092 encodes control signals (R-PDCCH signals) according to the aggregation size determined by aggregation size determining section 1091 and outputs the coded control signals to control signal assignment section 110.

Control signal assignment section 110 assigns the control signals (R-PDCCH signals) received from control signal coding section 109 to a resource and outputs the control signals to precoding section 111. Control signal assignment section 110 employs a configuration including R-PDCCH PRB determining section 1101 and assignment section 1102.

More specifically, R-PDCCH PRB determining section 1101 determines the PRB on which the control signals (R-PDCCH signals) are actually mapped among PRBs in the R-PDCCH search space on the basis of the eNB-RN channel quality information, the R-PDCCH aggregation size received from aggregation size determining section 1091, and the PRB bundling size, RBG size and search space information received from R-PDCCH search space determining section 105. For example, R-PDCCH PRB determining section 1101 selects a PRB subjected to PRB bundling among PRBs in the R-PDCCH search space and determines the PRB to be used for mapping the control signals (R-PDCCH signals).

Assignment section 1102 assigns the control signals (R-PDCCH signals) to the PRB determined by R-PDCCH PRB determining section 1101. In other words, assignment section 1102 assigns the control signals (R-PDCCH signals) for relay station 200 to the PRB subjected to PRB bundling among the PRBs in the R-PDCCH search space. The control signals (R-PDCCH) assigned to the PRB are outputted to precoding section 111.

Moreover, signal assignment section 108 and control signal assignment section 110 arrange the reference signals used for channel estimation (DM-RS) on a resource. For example, signal assignment section 108 and control signal assignment section 110 map the reference signals (e.g., DM-RS) at the last two symbols of each slot (both of the first and second slots or only the first slot) as illustrated in FIG. 4A or 4B.

Precoding section 111 performs precoding processing on the transmission signals (data signals) assigned to the resource by signal assignment section 108, the control signals (R-PDCCH signals) assigned to the resource by control signal assignment section 110, and the reference signals (DM-RS) assigned to the resource by signal assignment section 108 and control signal assignment section 110. Precoding section 111 distributes the signals that have been subjected to the precoding processing to radio transmission sections 112-1 and 112-2.

Precoding section 111 applies scheduling according to the rank configured in a configuration section (not illustrated) in the resource region in which data signals (PDSCH signals) are mapped (i.e., data region). For example, when the rank for the data signals (PDSCH signals)=2, precoding section 111 configures the power for each stream of signals to be half (½) of the previously set transmission power. Accordingly, base station 100 keeps the total transmission power constant regardless of the rank. Precoding section 111 applies the same precoding in the region in which the data signals (PDSCH signals) in the same PRG are mapped. In addition, precoding section 111 configures precoding to be applied to data signals (PDSCH signals) on a per subframe basis, for example. Meanwhile, as described above, since the rank of the resource region in which the control signals (R-PDCCH) are mapped is fixed to 1, precoding section 111 does not apply scaling to the control signals. More specifically, power boost is applied to R-PDCCH, so that the control signals (R-PDCCH) are transmitted with large power compared to the data signals (PDSCH signals).

Radio transmitting sections 112-1 and 112-2 perform radio transmission processing such as up-conversion on the signals received from precoding section 111 and transmits the processed signals via antennas 113-1 and 113-2.

(Configuration of Relay Station 200)

Figure 10:
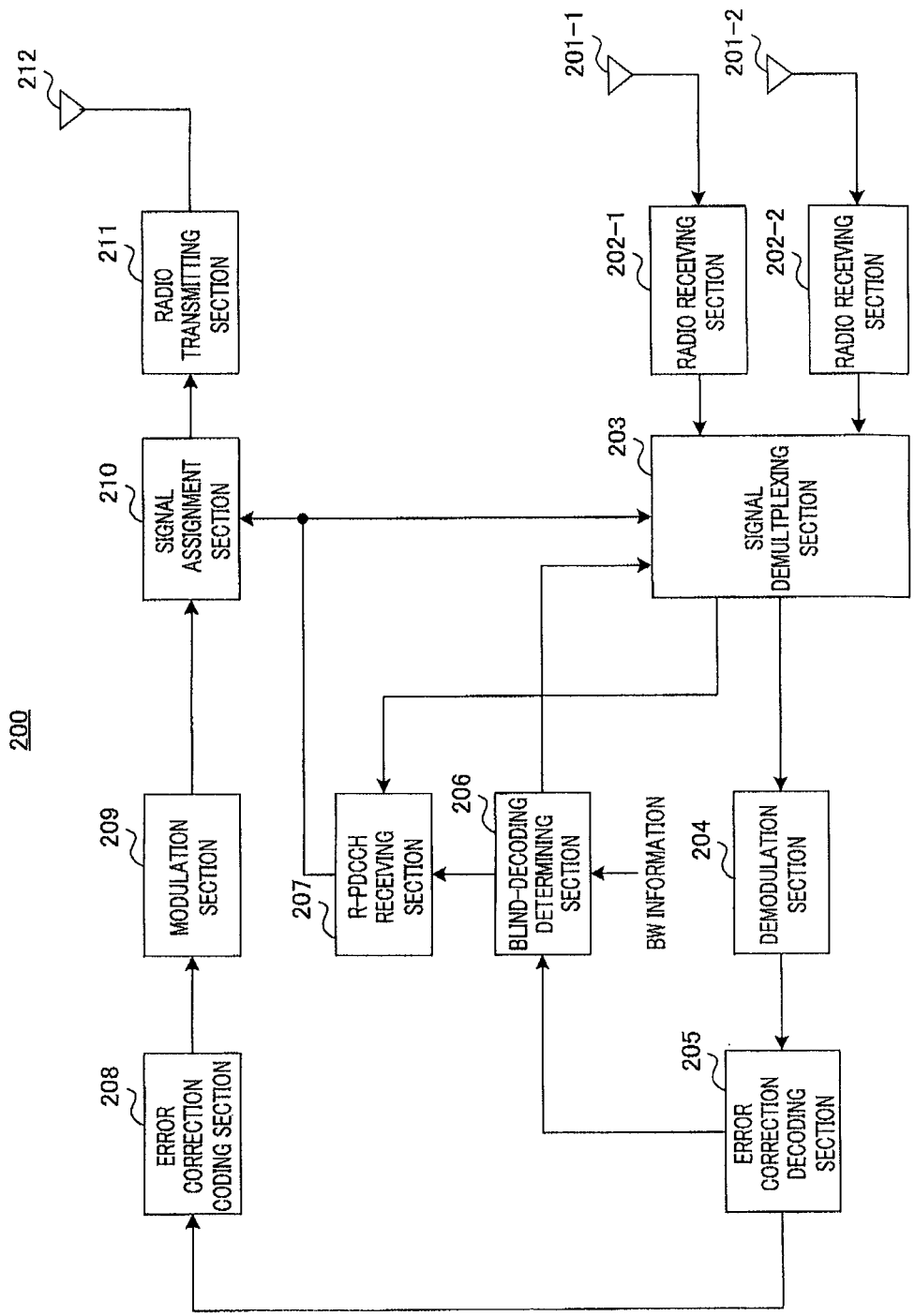
FIG. 10 is a block diagram illustrating a configuration of the relay station according to Embodiment 1 of the claimed invention.

FIG. 10 is a block diagram illustrating a configuration of relay station 200 according to Embodiment 1. In FIG. 10, relay station 200 includes antennas 201-1 and 201-2, radio receiving sections 202-1 and 202-2, signal demultiplexing section 203, demodulation section 204, error correction decoding section 205, blind-decoding determining section 206, R-PDCCH receiving section 207, error correction coding section 208, modulation section 209, signal assignment section 210, radio transmitting section 211, and antenna 212. Blind-decoding determining section 206 and R-PDCCH receiving section 207 form blind-decoding section.

Radio receiving sections 202-1 and 202-2 receive, respectively via antennas 201-1 and 201-2, signals transmitted from base station 100 or a mobile station, perform radio processing such as down-conversion on the signals, and outputs the processed signals to signal demultiplexing section 203.

Signal demultiplexing section 203 demultiplexes the received signals inputted from radio receiving sections 202-1 and 202-2 into blind-decoding target signals on the basis of blind decoding information received from blind-decoding determining section 206. The blind decoding information herein refers to information that indicates a blind-decoding target PRB among PRBs in the R-PDCCH search space and varies according to the aggregation size. The blind-decoding target PRB is a PRB on which the control signals (R-PDCCH signals) intended for relay station 200 are mapped. Signal demultiplexing section 203 outputs the blind-decoding target signals obtained by demultiplexing to R-PDCCH receiving section 207.

In addition, signal demultiplexing section 203 extracts data signals on the basis of the DL grant received from R-PDCCH receiving section 207. Signal demultiplexing section 203 applies MIMO spatial demultiplexing processing according to the rank received from R-PDCCH receiving section 207 to data for the relay station to demultiplex the data signals into data streams. During demultiplexing, signal demultiplexing section 203 extracts the reference signals (DM-RS) mapped in each resource region and performs channel estimation for the data signals (i.e., PDSCH signals) using the extracted reference signals. Signal demultiplexing section 203 herein performs channel estimation using the reference signals (DM-RS) mapped in the resource region in which the data signals (PDSCH signals) are mapped. Signal demultiplexing section 203 then identifies the precoding applied in base station 200 on the basis of the estimated channel estimation value.

Moreover, signal demultiplexing section 203 outputs the data streams obtained by demultiplexing and the channel estimation value to demodulation section 204. The channel estimation value used in MIMO spatial demultiplexing processing in signal demultiplexing section 203 will be described in detail, hereinafter.

Demodulation section 204 demodulates the data signals (PDSCH signals) on the basis of the channel estimation value received from signal demultiplexing section 203 and outputs the demodulated signals to error correction decoding section 205. More specifically, demodulation section 204 demodulates the signals on the basis of the reference signals (DM-RS) mapped on each resource. Demodulation section 204 herein demodulates the data signals using the reference signals (DM-RS) mapped on a resource region on which the data signals (PDSCH signals) are mapped.

Error correction decoding section 205 decodes the signals received from demodulation section 204 and outputs the R-PDCCH search space information in the decoded signals to blind-decoding determining section 206 and also outputs the demodulated signals to error correction coding section 208. Relay station 200 relays the signals transmitted from base station 100, through the transmission of signals by error correction coding section 208, demodulation section 209, signal assignment section 210, and radio transmitting section 211.

Blind-decoding determining section 206 determines the RBG size and PRG size (i.e., PRB bundling size) on the basis of the system bandwidth information (i.e., BW information) when the R-PDCCH search space information (R-PDCCH assignment region candidate information) received from error correction decoding section 205 is in units of RBGs. In addition, blind-decoding determining section 206 configures a blind-decoding target PRB for each aggregation size among PRBs included in the search space and generates blind-decoding information indicating the blind-decoding target PRB. The blind-decoding information is outputted to signal demultiplexing section 203 and R-PDCCH receiving section 207.

R-PDCCH receiving section 207 performs blind-decoding on the blind-decoding target signals received from signal demultiplexing section 203 on the basis of the blind-decoding information received from blind-decoding determining section 206 to detect the R-PDCCH signals intended for relay station 200. For example, R-PDCCH receiving section 207 performs channel estimation using the DM-RS mapped on the blind-decoding target PRB and extracts the R-PDCCH signals on the basis of the obtained channel estimation value. R-PDCCH receiving section 207 outputs DL grant and a rank included in the detected R-PDCCH signals to signal demultiplexing section 203. In addition, R-PDCCH receiving section 207 outputs UL grant included in the R-PDCCH signals to signal assignment section 210, for example.

Error correction coding section 208 performs error correction coding on the signals received from error correction decoding section 205 (i.e., signals transmitted from base station 100) and outputs the resultant signals to modulation section 209.

Modulation section 209 modulates the signals received from error correction coding section 208 and outputs the modulated signals to signal assignment section 210.

Signal assignment section 210 assigns the modulated signals received from modulation section 209 to a resource according to the UL grant reported from base station 100 (e.g., reported using R-PDCCH signals) and outputs the resultant signals to radio transmitting section 211.

Radio transmitting section 211 performs radio transmission processing such as up-conversion on the signals received from signal assignment section 210 and transmits the processed signals via antenna 211.

(Operations of Base Station 100 and Relay Station 200)

A description will be provided regarding operations of base station 100 and relay station 200 respectively including the configurations described above. The processing to calculate channel estimation values will be particularly described herein. R-PDCCH search space determining section 105 determines the PRB bundling size and RBG size on the basis of BW information in base station 100. For example, R-PDCCH search space determining section 105 determines that RBG size=3 and PRG size=3 in FIG. 11. More specifically, a PRG in which the same precoding is applied in units of RBGs each formed of three PRBs, namely, PRBs #0 to #2 is formed.

In addition, R-PDCCH search space determining section 105 determines the search space which is a resource region candidate for mapping control signals (R-PDCCH signals). For example, R-PDCCH search space determining section 105 determines the R-PDCCH search space within PRB #0 in FIG. 11. It should be noted that, when DL grant is mapped in first slot in the R-PDCCH region, the R-PDCCH search space is configured in the first slot of PRB #0. The search space information indicating the determined search space is transmitted to relay station 200.

Figure 11:
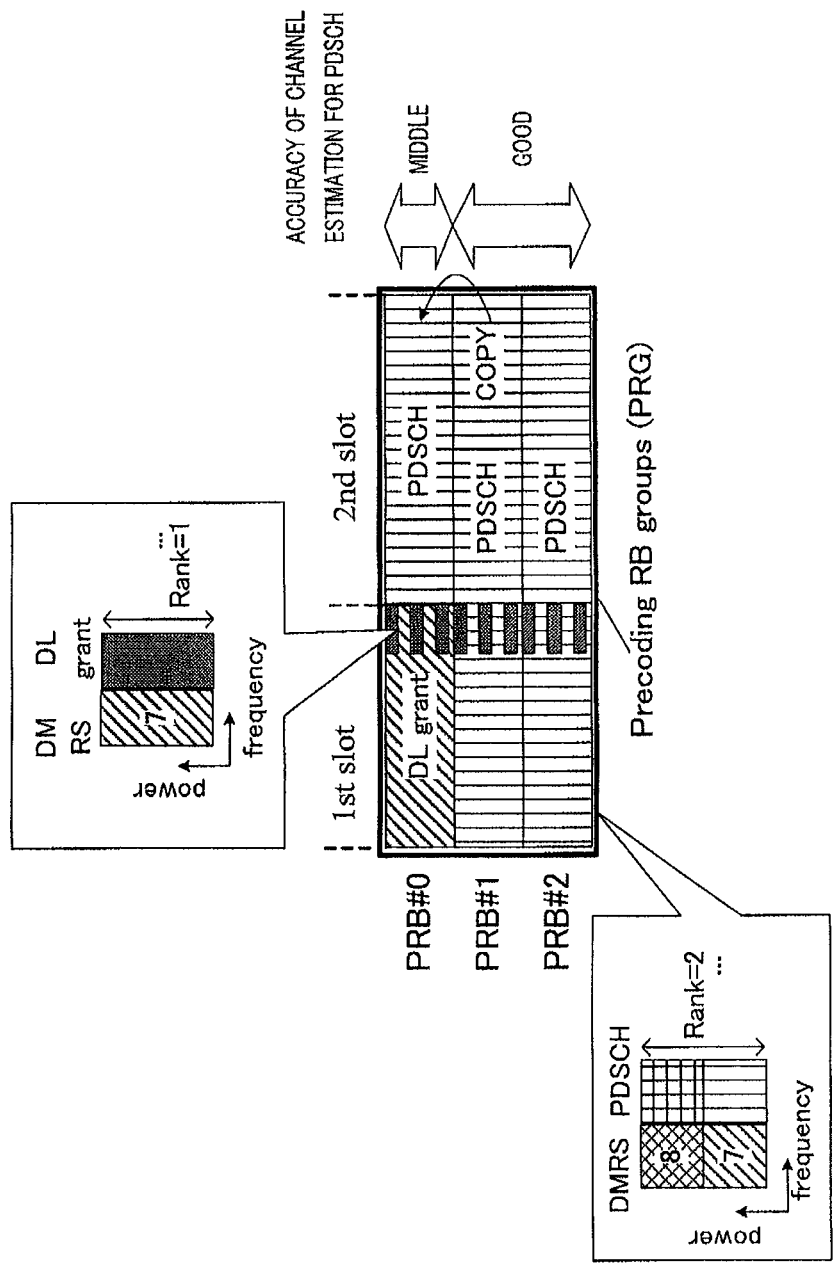
FIG. 11 is a diagram provided for describing channel estimation processing according to Embodiment 1 of the claimed invention.

In addition, the aggregation size of the R-PDCCH signals is set to 1 in FIG. 11.

In FIG. 11, control signal assignment section 110 maps the DL grant (R-PDCCH signals) in the first slot of PRB #0, and signal assignment section 108 maps the data signals (PDSCH signals) to the second slot of PRB #0, as well as PRB #1 and PRB #2. More specifically, base station 100 maps the DL grant (R-PDCCH signals) in the resource region corresponding to the first slot of PRB #0 (i.e., first region) and the data signals (PDSCH signals) to the second slot of PRB #0 other than the first slot of PRB #0, as well as PRB #1 and PRB #2 (i.e., second region).

In FIG. 11, the resource region in which data signals are mapped (i.e., second region) is formed of the resource region that has the same frequency as PRB #0 forming the resource region in which DL grant is mapped (i.e., first region) and that is subsequent to the resource region in the time domain (second slot of PRB #0, i.e., third region), and the resource regions, each having a frequency different from the resource region in which the DL grant is mapped (first region), (PRBs #1 and #2, i.e., fourth region).

In addition, signal assignment section 108 and control signal assignment section 110 map the reference signals (DM-RS) for channel estimation at the last two symbols of the first slots in PRBs #0 to #2 as illustrated in FIG. 11. In other words, the reference signals (DM-RS) used for channel estimation are mapped on both of the regions in which the DL grant is mapped (first region) and in which the data signals are mapped (second region).

Next, as illustrated in FIG. 11, precoding section 111 performs precoding processing of rank=1 on the DL grant and DM-RS in the first slot of PRB #0 in which the DL grant is mapped (first region) and applies power boost to the DL grant and DM-RS. Meanwhile, as illustrated in FIG. 11, precoding section 111 performs precoding processing of the configured rank (e.g., rank=2 in FIG. 11) on the data signals and DM-RS in the second slot of PRB #0 as well as PRBs #1 and #2 in which the data signals are mapped (second region).

More specifically, the data signals (PDSCH signals) mapped in the PRG (in units of RBGs) are transmitted using the same precoding. In addition, the precoding (rank) to be applied to the DM-RS is different between the resource region in which the DL grant is mapped (first region) and the resource regions in which the data signals are mapped (second region).

Meanwhile, in FIG. 11, blind-decoding determining section 206 determines that RBG size=3 and PRB bundling size=3 on the basis of BW information as in the case of base station 100. In addition, blind-decoding determining section 206 configures the first slot of PRB #0 to be the blind-decoding target PRB on the basis of the search space information from error correction decoding section 205.

Subsequently, signal demultiplexing section 203 demultiplexes the received signals into the signals mapped in the first slot of PRB #0, which is the blind-decoding target, and outputs the signals obtained by demultiplexing (i.e., blind-decoding target signals) to R-PDCCH receiving section 207.

R-PDCCH receiving section 207 receives the signals mapped on the PRB #0 (first slot), which is the blind-decoding target, from signal demultiplexing section 203 and performs blind-decoding on the signals (i.e., blind-decoding target) to detect the R-PDCCH signals intended for relay station 200. R-PDCCH receiving section 207 then outputs the DL grant (and rank) in the detected R-PDCCH signals to signal demultiplexing section 203.

Signal demultiplexing section 203 extracts the data signals intended for relay station 200, on the basis of the DL grant received from R-PDCCH receiving section 207. Moreover, signal demultiplexing section 203 performs MIMO spatial demultiplexing processing in accordance with the rank received from R-PDCCH receiving section 207 on the data signals (PDSCH signals).

During the processing, signal demultiplexing section 203 extracts a set of the reference signals (DM-RS) mapped in each of the resource regions and performs channel estimation for the data signals (PDSCH signals). More specifically, signal demultiplexing section 203 acquires at least one channel estimation value on a per PRB basis from at least one set of reference signals (DM-RS) that is mapped on each PRB. Signal demultiplexing section 203 herein performs channel estimation using the reference signals (DM-RS) mapped in the resource regions in which data signals (PDSCH signals) are mapped.

In FIG. 11, signal demultiplexing section 203 performs channel estimation using only the reference signals (DM-RS) mapped on PRBs #1 and #2 corresponding to the resource regions in which the data signals are mapped (second region). Signal demultiplexing section 203 first calculates a channel estimation value for each PRB using the sets of DM-RS respectively mapped on PRBs #1 and #2, for example. Subsequently, signal demultiplexing section 203 averages the channel estimation values obtained respectively for PRBs #1 and #2 to calculate an average. As illustrated in FIG. 11, signal demultiplexing section 203 uses the average between the channel estimation values on PRBs #1 and #2 not only as the channel estimation value on PRBs #1 and #2 but also the channel estimation value on PRB #0.

More specifically, signal demultiplexing section 203 performs channel estimation for the data signals (PDSHC signals) mapped in the resource region that has the same frequency as PRB #0 forming the resource region in which DL grant is mapped (first region) and that is subsequent to the resource region in the time domain (second slot of PRB #0, i.e., third region), using the reference signals (DM-RS) mapped in each of the resource regions (PRBs #1 and #2, i.e., fourth region) having a frequency different from the resource region in which the DL grant is mapped (first region).

Moreover, signal demultiplexing section 203 demultiplexes the signals into data streams on the basis of the estimated channel estimation values.

Demodulation section 204 demodulates the data signals using the channel estimation values obtained by signal demultiplexing section 203. More specifically, demodulation section 204 demodulates the data signals (PDSCH signals) mapped on PRBs #0 to #2 using the channel estimation value obtained using the sets of DM-RS mapped on PRBs #1 and #2 as illustrated in FIG. 11.

In other words, demodulation section 204 demodulates the data signals using DM-RS mapped in the resource regions (second region) other than the resource region (first region) in which the DL grant is mapped on the PRG (in units of RBGs) configured for relay station 200. Moreover, demodulation section 204 demodulates the data signals mapped in the resource region that is in the same frequency region as the resource region in which the DL grant is mapped (first region) and that is subsequent to the resource region in the time domain (second slot of PRB #0, i.e., third region), using the DM-RS mapped in each of the resource regions that have a frequency different from that of the resource region in which the DL grant is mapped (first region) (i.e., PRBs #1 and #2).

To put it differently, demodulation section 204 demodulates the PDSCH signals using the DM-RS in PRBs #1 and #2 on which PDSCH signals are mapped (i.e., reference signals to which the same precoding as that for the PDSCH signals is applied) without using the DM-RS in the first slot of PRB #0 in which DL grant is mapped (i.e., reference signals to which precoding different from that for the PDSCH signals is applied).

Incidentally, the propagation environments of the respective PRBs in the PRG (e.g., up to three RBs per PRG in FIG. 5) configured for relay station 200 as illustrated in FIG. 11 are likely to be similar to one another. Accordingly, relay station 200 can make a copy of the channel estimation value for some PRBs in the same PRG (PRBs #1 and #2 in FIG. 11) and divert the channel estimation value for another PRB (PRB #0 in FIG. 11).

Figure 7:
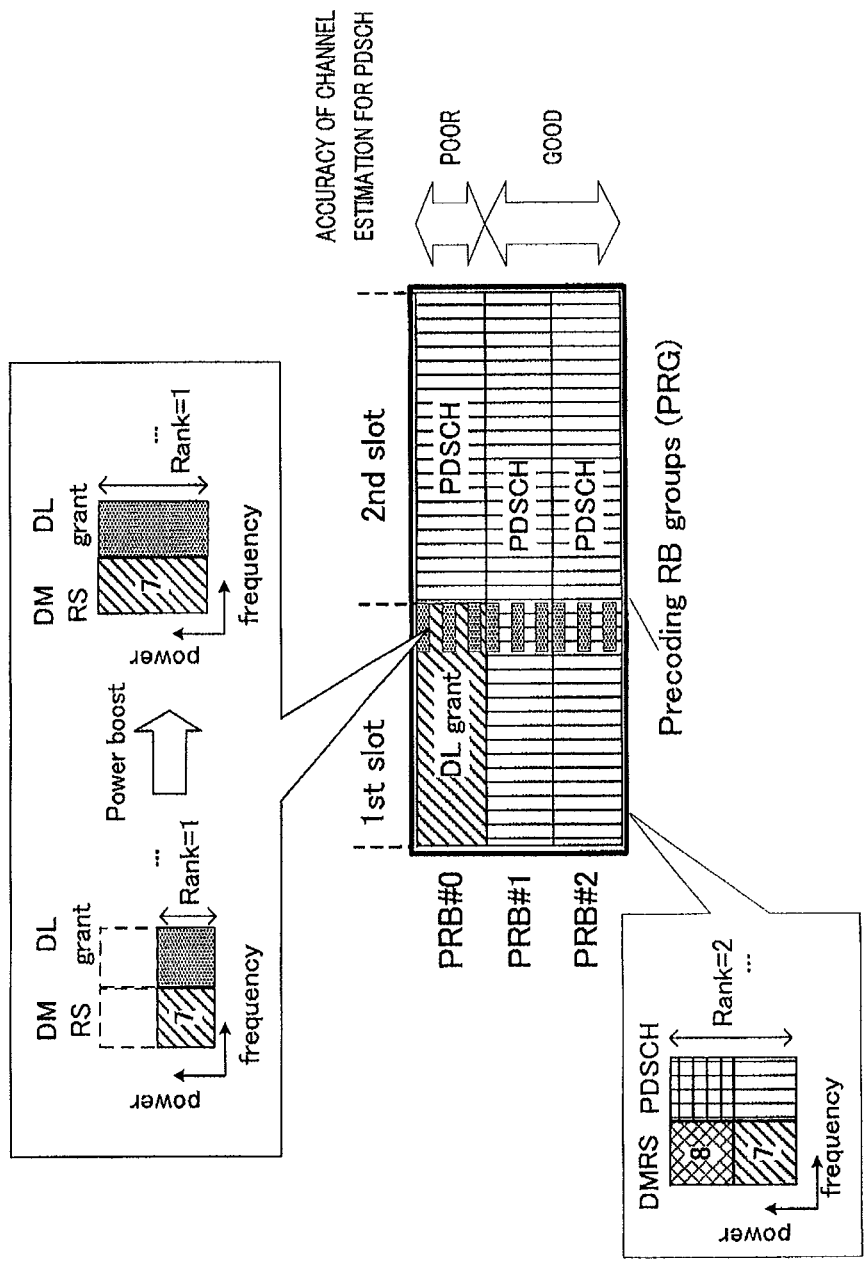
FIG. 7 is a diagram provided for describing a difference in accuracy of channel estimation on a plurality of PRBs in the same PRG.

Accordingly, as illustrated in FIG. 11, the accuracy of channel estimation for the PDSCH signals can be improved on PRB #0 by demodulating the PDSCH signals using the DM-RS to which the same precoding as that for the PDSCH signals on other PRBs #1 and #2 is applied in comparison with the case where the PDSCH signals are demodulated using the DM-RS to which precoding different from that for the PDSCH signals is applied (FIG. 7). To put it differently, it is possible to avoid the situation where the accuracy of channel estimation becomes poor on PRB #0 where the DM-RS to which precoding different from that for the PDSCH signals is applied is mapped.

As described above, in Embodiment 1, relay station 200 performs reception processing, considering that the same precoding is applied to data signals (PDSCH signals) while different precoding is used only in the first slot of a PRB on which DL grant is mapped among a plurality of PRBs in units of RBGs forming a PRG. More specifically, relay station 200 does not use the DM-RS on the PRB on which DL grant is mapped (i.e., reference signals to which precoding different from that for PDSCH signals is applied). In addition, relay station 200 performs channel estimation using only the DM-RS on a PRB on which only PDSCH signals are mapped (i.e., PRB other than the PRB on which DL grant is mapped) (i.e., reference signals to which the same precoding as that for the PDSCH signals is applied). Accordingly, relay station 200 can demodulate the PDSCH signals without degrading the accuracy of channel estimation even on the PRB on which DL grant is mapped.

Thus, according to Embodiment 1, the accuracy of channel estimation for PDSCH can be improved even when DL grant indicating R-PDCCH downlink data assignment is mapped therewith.

In Embodiment 1, a description has been given regarding the case where relay station 200 uses, as the channel estimation value for PRB #0, the average between the channel estimation values calculated using the sets of DM-RS on PRBs #1 and #2. However, Embodiment 1 is not limited to this case. Relay station 200 may use the channel estimation value on PRB #1, which is adjacent to PRB #0, as the channel estimation value on PRB#0 among the channel estimation values calculated using the sets of DM-RS on PRBs #1 and #2, for example. Accordingly, the channel estimation value on PRB #1 closest to PRB #0 (i.e., PRB the propagation environment of which is most similar to that of PRB #0) is used on PRB #0, so that it is possible to avoid a degradation in the accuracy of channel estimation on PRB #0 to which precoding different from that for PDSCH signals is applied.

In Embodiment 1, a description has been given regarding the case where the correspondence between the system bandwidth and PRG sizes as illustrated in FIG. 5 is used. However, the PRG sizes used in Embodiment 1 are not limited to these PRG sizes. For example, the PRG sizes may be changed with respect to the system bandwidth as deemed appropriate in order to improve the SNR and also to configure favorable beams by equalizing the influence of frequency-selective fading.

Embodiment 2

In Embodiment 2, a base station controls assignment of signals mapped in the second slot according to signals mapped in the first slot of each PRB.

In Embodiment 1, the relay station demodulates data signals using the DM-RS to which the same precoding as that for PDSCH signals is applied in the same PRG. However, as the rank increases for the precoding applied to PDSCH signals, a further problem may arise.

More specifically, although the propagation environments become similar to each other on adjacent PRBs, the actual channel response gradually differs between the PRBs due to frequency-selective fading. The influence of differences in channel response between PRBs appears more obviously when the rank is higher. This is because the higher the rank is, the higher the accuracy of channel estimation will be required in spatial demultiplexing processing. In this case, data demodulation may become difficult in the relay station not only due to a degradation in demodulation performance in the demodulation section but also due to a degradation in spatial demultiplexing performance in the signal demultiplexing section.

Meanwhile, extrapolation using a channel estimation value obtained from DM-RS to which the same precoding as that for PDSCH signals is applied in the same PRG may be used to avoid a degradation in the accuracy of channel estimation due to the abovementioned influence. However, the channel estimation processing based on extrapolation requires an enormous amount of processing.

Incidentally, when DM-RS used for channel estimation is mapped only in the first slot (see, FIG. 4B), the accuracy of channel estimation degrades only on the PRB on which R-PDCCH signals are mapped in a PRG as described above.

In this respect, in Embodiment 2, the base station maps data signals (PDSCH signals) in a PRB other than the PRB on which R-PDCCH signals are mapped, without mapping data signals (PDSCH signals) in the PRB on which DL grant (R-PDCCH signals) is mapped in a PRG configured for the relay station.

Figure 12:
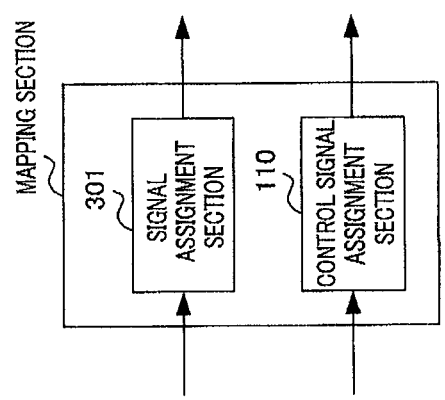
FIG. 12 is a main configuration diagram of a base station according to Embodiment 2 of the claimed invention.

FIG. 12 is a main configuration diagram of base station 300 according to Embodiment 2. In base station 300, signal assignment section 301 and control signal assignment section 110, which serve as a mapping section, map reference signals (e.g., DM-RS) in a first region and a second region of a precoding resource block group (PRG) formed of one or more PRBs among a plurality of physical resource blocks (PRBs) formed by dividing a frequency region, map control signals (e.g., DL grant) in the first region and map data (downlink signals, e.g., PDSCH signals) in the second region. Signal assignment section 301 maps no data in the region that is in the same frequency region as the PRB forming the first region and that is subsequent to the PRB in the time domain. Accordingly, the reference signals, control signals and data mapped on the respective resources are transmitted to relay station 400.

Figure 13:
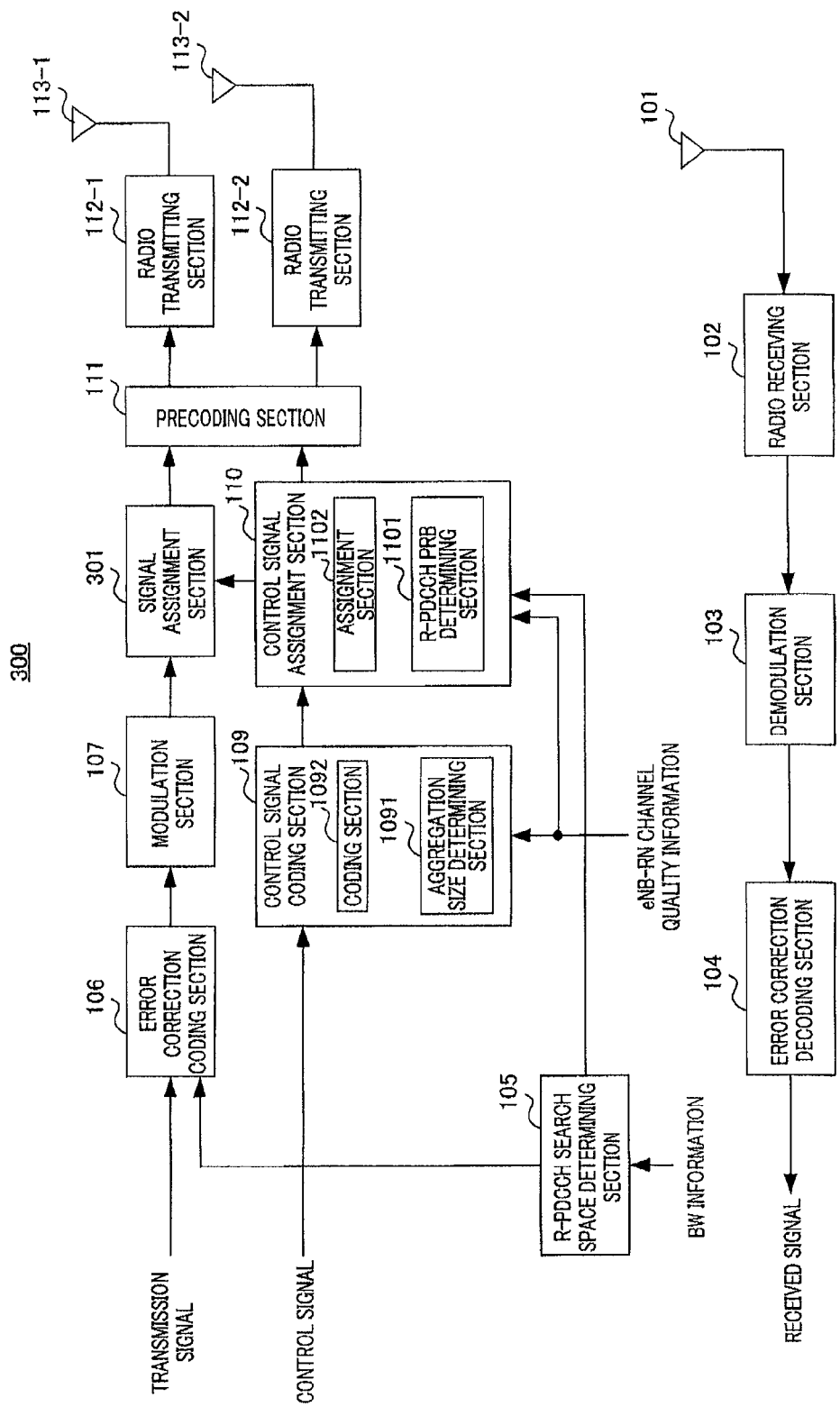
FIG. 13 is a block diagram illustrating a configuration of the base station according to Embodiment 2 of the claimed invention.

FIG. 13 illustrates a configuration of base station 300 according to Embodiment 2. In FIG. 13, the same elements as those in Embodiment 1 (FIG. 9) are assigned the same reference numerals and any duplicate description of the elements is omitted. Base station 300 illustrated in FIG. 13 is different from the base station in Embodiment 1 in the operation of signal assignment section 301.

More specifically, in base station 300, signal assignment section 301 receives information indicating the PRB on which R-PDCCH signals are mapped from control signal assignment section 110. When assigning the transmission signals (PDSCH signals) received from modulation section 107 to a resource, signal assignment section 301 excludes the PRB indicated by the information received from control signal assignment section 110 (i.e., PRB to which the R-PDCCH signals are assigned) from transmission signal assignment targets. In short, signal assignment section 301 maps no transmission signals in the resource region that is in the same frequency region as the PRB forming the resource region in which R-PDCCH signals are mapped and that is subsequent to the PRB in the time domain. In other words, signal assignment section 301 maps the transmission signals on a PRB other than the PRB on which R-PDCCH signals are mapped.

Figure 14:
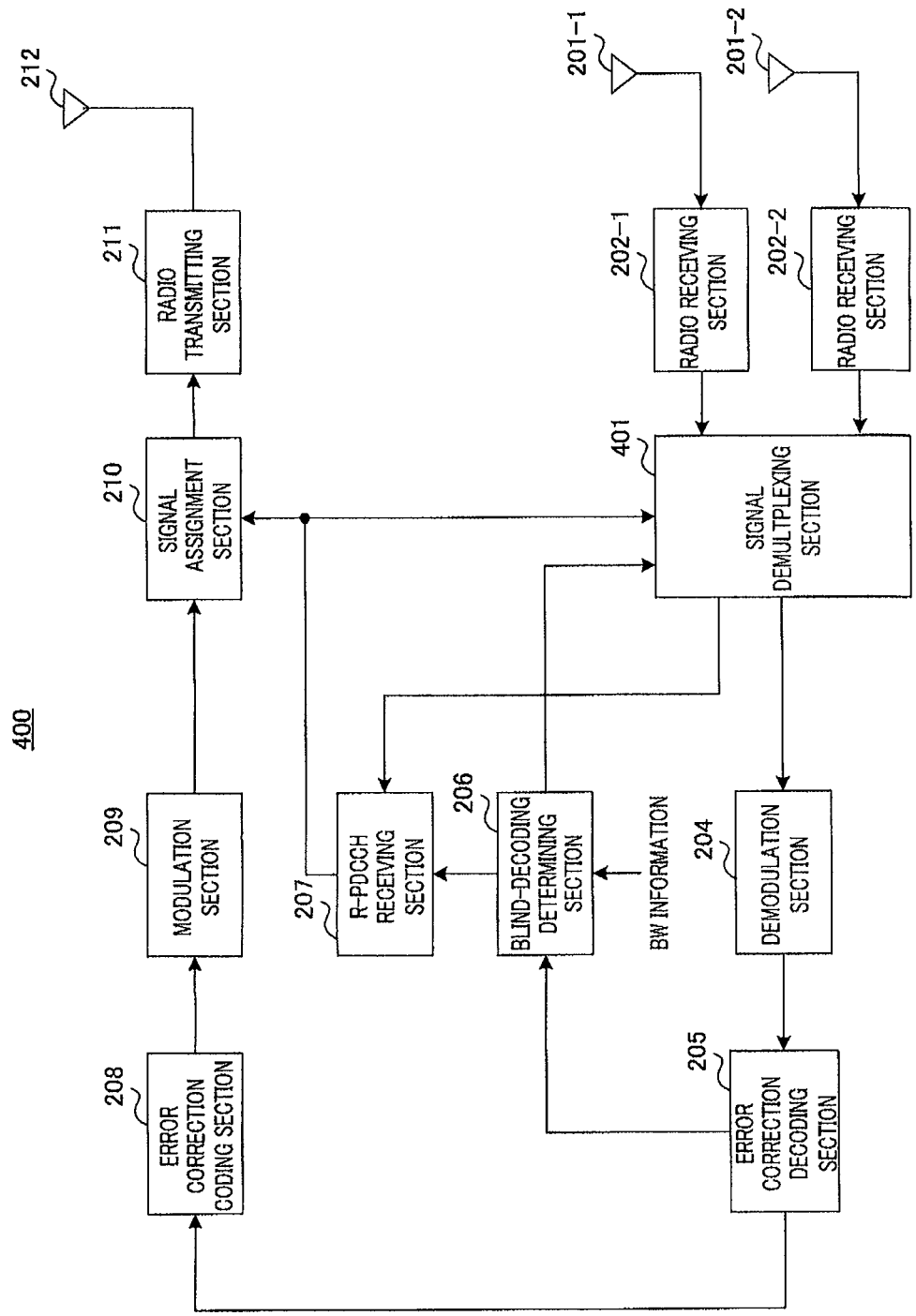
FIG. 14 is a block diagram illustrating a configuration of a relay station according to Embodiment 2 of the claimed invention.

FIG. 14 illustrates a configuration of relay station 400. In FIG. 14, the same elements as those in Embodiment 1 (FIG. 10) are assigned the same reference numerals and any duplicate description of the elements is omitted. Relay station 400 illustrated in FIG. 14 is different from the relay station in Embodiment 1 in the operation of signal demultiplexing section 401.

More specifically, in relay station 400, signal demultiplexing section 401 extracts data signals (PDSCH signals) according to the DL grant to be received from R-PDCCH receiving section 207 as in Embodiment 1. In addition, signal demultiplexing section 401 demultiplexes the signals into data streams by application of MIMO spatial demultiplexing processing according to the rank received from R-PDCCH receiving section 207. Signal demultiplexing section 401 then outputs the data streams obtained by demultiplexing to demodulation section 204. During this processing, signal demultiplexing section 401 excludes the signals mapped on the PRB to which the R-PDCCH signals are assigned (i.e., signals in the resource region that is in the same frequency region as the resource region in which the R-PDCCH signals are mapped and that is subsequent to the resource region in the time domain) and outputs the remaining signals to demodulation section 204.

(Operations of Base Station 300 and Relay Station 400)

A description will be provided regarding operations of base station 300 and relay station 400 including the above described configurations, respectively. A description will be particularly provided regarding data signal assignment processing herein.

Figure 15:
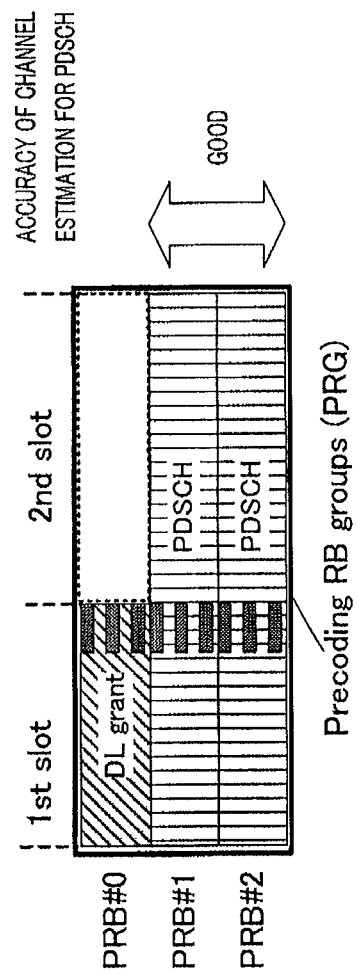
FIG. 15 is a diagram provided for describing data signal assignment processing according to Embodiment 2 of the claimed invention.

In the following description, as in Embodiment 1 (FIG. 11), the PRG is configured in units of RBGs each formed of three PRBs, which are PRBs #0 to #2, with the following settings: RBG size=3 and PRG size=3 as illustrated in FIG. 15. PRB#0 is configured as the R-PDCCH search space as illustrated in FIG. 15. Moreover, the aggregation size of R-PDCCH signals is set equal to one RB as illustrated in FIG. 15.

As illustrated in FIG. 15, signal assignment section 301 in base station 300 maps no data signals (PDSCH signals) to the second slot of PRB #0 on which DL grant (R-PDCCH signals) is mapped. More specifically, signal assignment section 301 maps no data signals (PDSCH signals) in the resource region that is in the same frequency region as PRB #0 forming the resource region in which the DL grant (R-PDCCH signals) is mapped (first slot of PRB #0, i.e., first region) signals and that is subsequent to the PRB in the time domain (second slot of PRB #0, i.e., second region). In other words, signal assignment section 301 maps data signals on PRBs #1 and #2 other than PRB #0 on which the DL grant is mapped. More specifically, the resource region on which the data signals are mapped (second region) is formed of the resource regions having a frequency different from that of the resource region in which the DL grant is mapped (first region) (i.e., PRBs #1 and #2) in FIG. 15.

Meanwhile, in FIG. 15, signal demultiplexing section 401 in relay station 400 extracts data signals intended for relay station 400 on the basis of the DL grant to be received from R-PDCCH receiving section 207 as in Embodiment 1. As illustrated in FIG. 15, no data signals (PDSCH signals) are mapped in the second slot of PRB #0 on which DL grant is mapped.

Meanwhile, signal demultiplexing section 203 performs channel estimation using the reference signals (DM-RS) mapped on PRBs #1 and #2 as in Embodiment 1. Signal demultiplexing section 203 then demultiplexes the signals into data streams on the basis of the channel estimation values. Accordingly, as illustrated in FIG. 15, the data signals (PDSCH signals) mapped on PRBs #1 and #2 other than PRB #0 to which the R-PDCCH signals are allocated among PRBs #0 to #2 forming the PRG are outputted to demodulation section 204.

Demodulation section 204 demodulates the data signals (PDSCH signals) mapped on PRBs #1 and #2, using the channel estimation values obtained using the sets of DM-RS mapped on PRBs #1 and #2 as illustrated in FIG. 15.

As described, base station 300 transmits no PDSCH signals on the PRB where the DM-RS to which precoding different from that for the PDSCH signals is applied is mapped. Thus, relay station 400 does not have to perform receiving processing on the PDSCH signals using the DM-RS to which precoding different from that for the PDSCH signals is applied. Accordingly, relay station 400 can avoid a degradation in the accuracy of channel estimation for PDSCH signals and obtain good accuracy of channel estimation. In other words, it is possible to avoid the situation where data demodulation becomes difficult due to erroneous channel estimation when data is mapped on the PRB on which DL grant is mapped.

As described, according to Embodiment 2, the accuracy of channel estimation for PDSCH can be improved even when the DL grant indicating R-PDCCH downlink data assignment is mapped therewith. Moreover, Embodiment 2 eliminates the need for a circuit having a large processing capacity for performing extrapolation while using a channel estimation value of an adjacent PRB for ensuring high accuracy of channel estimation when the rank is high. For this reason, it is possible to avoid an increase in the hardware cost of the relay station.

In Embodiment 2, the base station does not have to map any PDSCH signals on a PRB (i.e., search space) on which DL grant may be mapped, when PRG=1. When it says PRG=1, this means that there is no fourth region (i.e., resource region having a frequency different from that of the resource region on which DL grant is mapped (first region)). In this case, there is no resource region to which the same precoding as that for the third region (resource region that has the same frequency as the PRB forming the resource region on which DL grant is mapped (first region) and that is subsequent to the PRB in the time domain) can be applied. For this reason, in order to secure high accuracy of channel estimation when the rank is high, there is required a circuit having a large processing capacity for interpolating a channel estimation value while using a channel estimation value of an adjacent PRB and estimating precoding used for the adjacent PRB and precoding used for the third region. However, since the base station employs the configuration in which no PDSCH signals are mapped on any PRB on which DL grant may be mapped, when PRG=1, the circuit having a large amount of processing is no longer required regardless of actual mapping of DL grant. Thus, it is possible to avoid an increase in the hardware cost of the relay station.

Embodiment 3

In Embodiment 3, a base station controls assignment of PDSCH signals on a PRB forming the resource region on which R-PDCCH signals are mapped, according to the rank configured for the PDSCH signals.

As described in Embodiment 2, the influence of differences in channel response between PRBs due to frequency-selective fading appears more obviously when the rank is higher. More specifically, it can be said that the influence of differences in channel response between PRBs due to frequency-selective fading is low when the rank for data signals (PDSCH signals) is low.

In particular, when the rank of PDSCH signals is equal to 1, the same precoding as that for DL grant having a fixed rank (rank=1) is applied to the PDSCH signals.

In this respect, the base station selects whether or not to map data signals (PDSCH signals) on the PRB on which DL grant (R-PDCCH signals) is mapped, according to the rank for the data signals (PDSCH signals). More specifically, the base station maps the data signals in the resource region that has the same frequency as the PRB forming the resource region on which DL grant is mapped and that is subsequent to the PRB in the time domain, only when the same precoding is applied to the DL grant (R-PDCCH signals) and the data signals (PDSCH signals).

Figure 16:
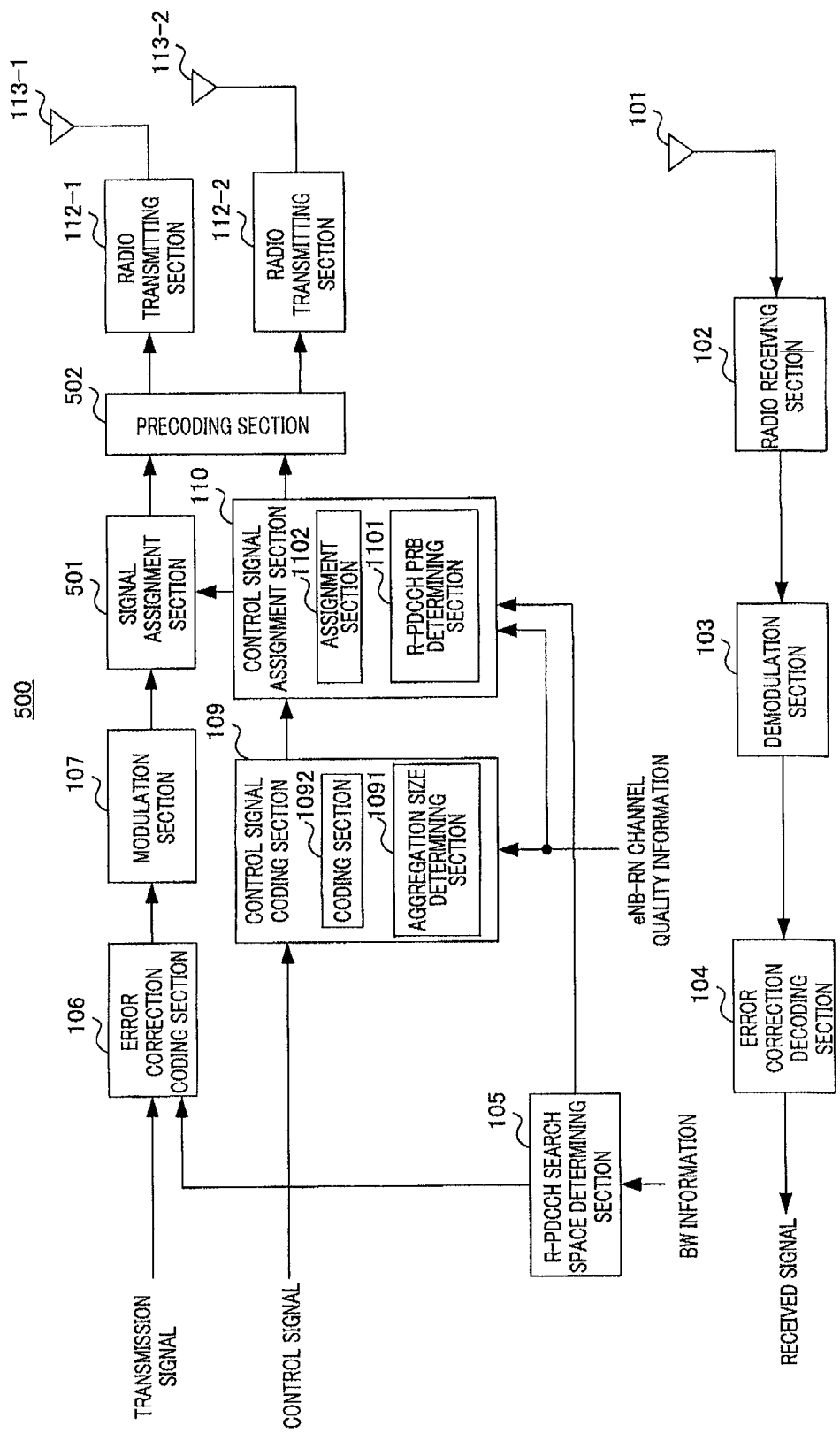
FIG. 16 is a block diagram illustrating a configuration of a base station according to Embodiment 3 of the claimed invention.

FIG. 16 illustrates a configuration of base station 500 according to Embodiment 3. In FIG. 16, the same elements as those in Embodiment 1 (FIG. 9) are assigned the same reference numerals and any duplicate description of the elements is omitted. Base station 500 illustrated in FIG. 16 is different from the base station in Embodiment 1 in the operations of signal assignment section 501 and precoding section 502.

More specifically, the rank for PDSCH signals and the information indicating the PRB to which R-PDCCH signals are assigned are inputted from control signal assignment section 110 to signal assignment section 501. When assigning the transmission signals (PDSCH signals) received from modulation section 107 to a resource, signal assignment section 501 excludes, from the assignment targets for the transmission signals, the PRB indicated by the information received from control signal assignment section 110 (i.e., PRB to which R-PDCCH signals are assigned) when a plurality of ranks are configured. Meanwhile, when the rank is one, signal assignment section 501 maps the transmission signals in the resource region including the PRB indicated by the information received from control signal assignment section 110 (i.e., PRB to which R-PDCCH signals are assigned).

When a plurality of ranks are configured for the data signals (PDSCH signals), precoding section 502 applies power boost to the R-PDCCH signals and applies scaling to the data signals as in Embodiment 1. When the rank configured for the data signals (PDSCH signals) is one, precoding section 502 applies power boost to both of the R-PDCCH signals and the data signals and applies the same precoding thereto.

Figure 17:
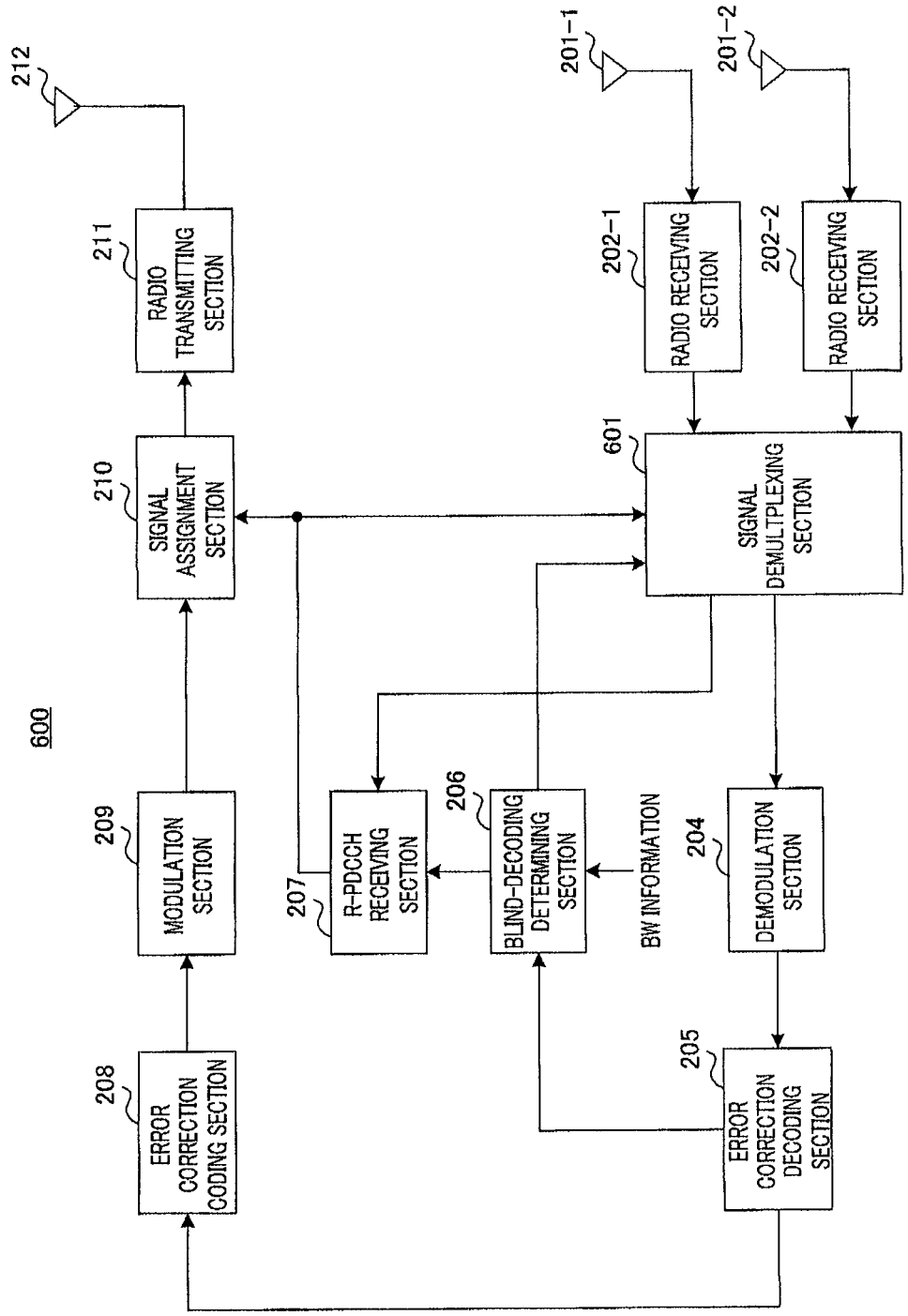
FIG. 17 is a block diagram illustrating a configuration of a relay station according to Embodiment 3 of the claimed invention.

FIG. 17 illustrates a configuration of relay station 600 according to Embodiment 3. In FIG. 17, the same elements as those in Embodiment 1 (FIG. 10) are assigned the same reference numerals and any duplicate description of the elements is omitted. Relay station 600 illustrated in FIG. 17 is different from the relay station in Embodiment 1 in the operation of signal demultiplexing section 601.

To be more specific, signal demultiplexing section 601 in relay station 600 extracts data signals (PDSCH signals) according to the DL to be received from R-PDCCH receiving section 207 as in Embodiment 1. In addition, signal demultiplexing section 601 demultiplexes the signals into data streams by application of MIMO spatial demultiplexing processing according to the rank received from R-PDCCH receiving section 207. Signal demultiplexing section 601 outputs the data streams obtained by demultiplexing to demodulation section 204.

During this processing, when there are a plurality of ranks for the data signals (PDSCH signals), signal demultiplexing section 601 excludes the signals mapped on the PRB to which the R-PDCCH signals are assigned (i.e., signals in the resource region that is in the same frequency region as the resource region in which the R-PDCCH signals are mapped and that is subsequent to the resource region in the time domain) and outputs the remaining signals to demodulation section 204. In addition, signal demultiplexing section 601 performs channel estimation using the reference signals (DM-RS) mapped on the PRB other than the PRB on which the R-PDCCH signals are mapped.

Meanwhile, when the rank for the data signals (PDSCH signals) is one, signal demultiplexing section 601 outputs the signals including the data mapped on the PRB to which the R-PDCCH signals are assigned to demodulation section 204. In addition, signal demultiplexing section 601 performs channel estimation using the reference signals (DM-RS) mapped on the PRB on which the data signals (PDSCH signals) and R-PDCCH signals are mapped. For example, signal demultiplexing section 601 averages the channel estimation value on the PRB on which the R-PDCCH signals are mapped and the channel estimation value on another PRB in a PRG and thus improves the accuracy of channel estimation.

(Operations of Base Station 500 and Relay Station 600)

A description will be provided regarding operations of base station 500 and relay station 600 including the above described configurations, respectively. A description will be herein provided regarding data signal assignment processing in particular.

Figures 18A, 18B:
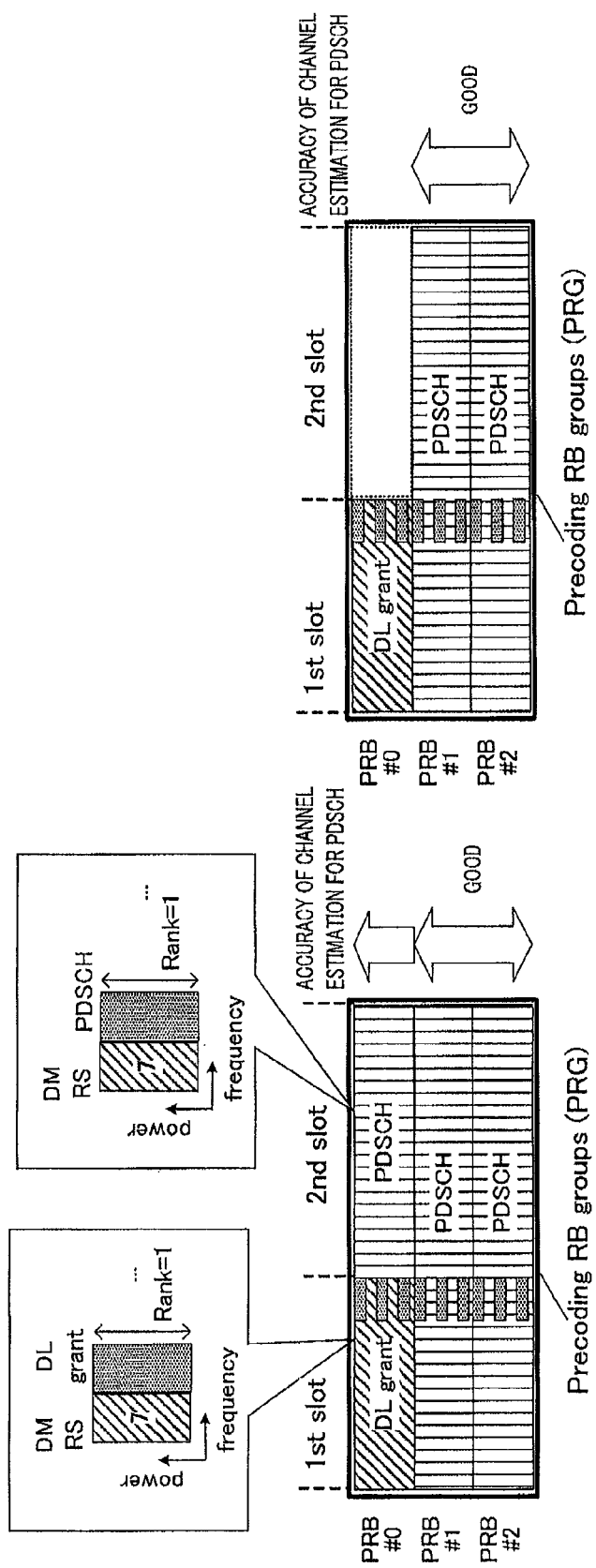
FIGS. 18A and 18B are diagrams provided for describing data signal assignment processing according to Embodiment 3 of the claimed invention.
Figure 19:
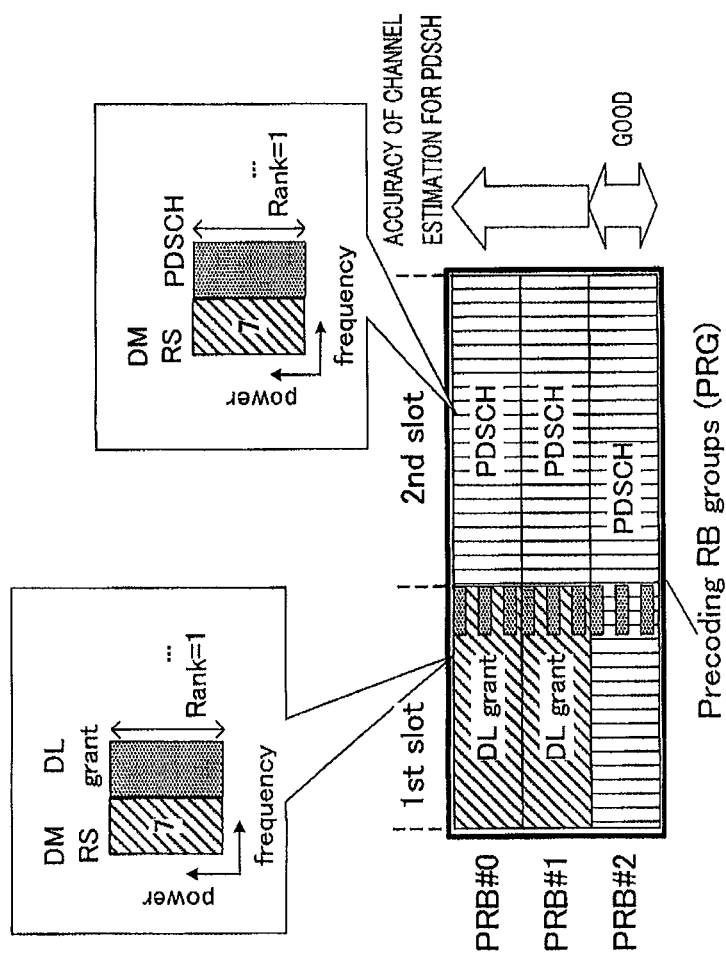
FIG. 19 is a diagram illustrating a variation of Embodiment 3 of the claimed invention.

In the following description, as in Embodiment 1 (FIG. 11), the PRG is configured in units of RBGs each formed of three PRBs, which are PRBs #0 to #2, with the following settings: RBG size=3 and PRG size=3 as illustrated in FIGS. 18A and 18B. In addition, PRB #0 is configured as the R-PDCCH search space as illustrated in FIGS. 18A and 18B. In addition, the aggregation size of the R-PDCCH signals is set equal to one RB as illustrated in FIGS. 18A and 18B. The rank for data signals (PDSCH signals) is set equal to one in FIG. 18A while the rank for data signals (PDSCH signals) is set equal to two in FIG. 18B.

Since the rank for data signals (PDSCH signals) is one as illustrated in FIG. 18A, signal assignment section 501 in base station 500 maps data signals in the second slot as well in PRB #0 on which DL grant (R-PDCCH signals) is mapped.

In addition, since the rank for data signals (PDSCH signals) is one as illustrated in FIG. 18A, precoding section 502 applies power boost to the DL grant (R-PDCCH signals) and data signals. More specifically, the DL grant (R-PDCCH signals) and data signals (PDSCH signals) are transmitted using the same precoding in FIG. 18A.

Meanwhile, since the rank for data signals (PDSCH signals) is two as illustrated in FIG. 18B, signal assignment section 501 maps no data signals in the second slot of PRB #0 on which DL grant (R-PDCCH signals) is mapped.

In addition, since the rank for data signals (PDSCH signals) is two as illustrated in FIG. 18B, precoding section 502 performs the precoding processing of the configured rank as in Embodiment 1. More specifically, the DL grant (R-PDCCH signals) and data signals are transmitted using different precoding in FIG. 18B.

In other words, signal assignment section 501 maps the data signals (PDSCH signals) in the resource region that is in the same frequency region as the first slot of PRB #0 on which the DL grant is mapped (first region) and that is subsequent to the resource region in the time domain (i.e., second slot of PRB #0) only when the same rank is configured for the DL grant and data signals (i.e., transmitted using the same precoding) (see, FIG. 18A).

Meanwhile, signal demultiplexing section 601 in relay station 600 extracts data signals intended for relay station 600 on the basis of the DL grant received from R-PDCCH receiving section 207 as in Embodiment 1.

As illustrated in FIG. 18A (rank for the data signals=1), the data signals (PDSCH signals) are mapped in the second slot of PRB #0 on which the DL grant is mapped. Meanwhile, as illustrated in FIG. 18B (rank for the data signals=2), no data signals (PDSCH signals) are mapped in the second slot of PRB #0 on which the DL grant is mapped.

In FIG. 18A (rank for data signals=1), signal demultiplexing section 203 performs channel estimation for the PDSCH signals using the DM-RS mapped on the first slot of PRB #0 (first region) and the DM-RS mapped on PRBs #1 and #2 (second region). More specifically, demodulation section 204 demodulates the data signals (PDSCH signals) mapped on PRBs #0 to #2 using the channel estimation values obtained using the DM-RS mapped in the first slot of PRB #0 and the DM-RS mapped on PRBs #1 and #2 in FIG. 18A.

Meanwhile, in FIG. 18B (rank for data signals=2), signal demultiplexing section 203 performs channel estimation for the PDSCH signals using only the DM-RS mapped on PRBs #1 and #2 (second region). More specifically, demodulation section 204 demodulates the data signals (PDSCH signals) mapped on PRBs #1 and #2 using the channel estimation values obtained using the DM-RS mapped on PRBs #1 and #2 in FIG. 18B.

As described above, base station 500 transmits no PDSCH signals on the PRB where the DM-RS (R-PDCCH signals) to which precoding different from that for PDSCH signals is applied is mapped. Thus, relay station 600 can avoid a degradation in the accuracy of channel estimation for PDSCH signals and obtain good accuracy of channel estimation as in Embodiment 2.

Moreover, base station 500 transmits PDSCH signals on the PRB where the DM-RS (R-PDCCH signals) to which the same precoding as that for the PDSCH signals is applied is mapped. More specifically, base station 500 transmits PDSCH signals on the PRB on which R-PDCCH signals are mapped, only when the rank for the PDSCH signals is the same as the rank for the R-PDCCH signals (fixed; rank=1). Accordingly, relay station 600 can use all the channel estimation values on PRBs #0 to #2 in the PRG. Thus, it is possible to improve the accuracy of channel estimation for PDSCH signals in relay station 600 while preventing a decrease in transmission efficiency of the PRB on which R-PDCCH signals are allocated. More specifically, it is possible to minimize a decrease in transmission efficiency due to a decrease in the number of data assignment PRBs without causing a degradation in the accuracy of channel estimation even when the rank for PDSCH signals is high.

Thus, according to Embodiment 3, it is possible to improve the accuracy of channel estimation for PDSH while preventing a decrease in transmission efficiency even when DL grant indicating the downlink data assignment of R-PDCCH is mapped therewith. Moreover, as with Embodiment 2, Embodiment 3 eliminates the need for a circuit having a large processing capacity for performing extrapolation while using a channel estimation value of an adjacent PRB for ensuring high accuracy of channel estimation when the rank is high. Thus, it is possible to avoid an increase in the hardware cost of the relay station.

It should be noted that, although Embodiment 1 has been described regarding the case where the aggregation size of R-PDCCH=1, the claimed invention can be applied to a case where the aggregation size is equal to two or higher (i.e., resource region in which DL grant is mapped (first region) is formed of a plurality of PRBs). More specifically, the base station may map data signals (PDSCH signals) in the resource region that is in the same frequency region as the PRB forming the resource region in which DL grant is mapped (first region) and that is subsequent to the resource region in the time domain only when the DL grant (R-PDCCH signals) is mapped in the first slot of a plurality of PRBs (first region) and the data signals (PDSCH signals) mapped in the resource region different from the first region (second region) are transmitted using the same precoding. With this configuration, even if aggregation is applied to the R-PDCCH (DL grant), it is possible to improve the accuracy of channel estimation for the PDSCH while preventing a decrease in transmission efficiency even when the DL grant indicating R-PDCCH downlink data assignment is mapped therewith, as in Embodiment 3.

In addition, Embodiment 3 has been described regarding the case where the base station selects whether or not to map data signals (PDSCH signals) on the PRB on which R-PDCCH signals are mapped, according to the rank for the PDSCH signals. However, Embodiment 3 is not limited to this case, and the base station may select whether or not to map data signals (PDSCH signals) on the PRB on which R-PDCCH signals are mapped, according to another index associated with the rank for the PDSCH signals. For example, the aggregation size of R-PDCCH (i.e., CCE aggregation size) may be used as another index associated with the rank. Aggregation is likely to be applied to R-PDCCH when the rank for PDSCH signals is one. Accordingly, when the aggregation size is at least two (i.e., when aggregation is applied), the base station may map data signals (PDSCH signals) on the PRB on which R-PDCCH signals are mapped. Thus, it is possible to avoid a decrease in transmission efficiency. Meanwhile, when the aggregation size is one (i.e., when no aggregation is applied), the base station maps no data signals (PDSCH signals) on any PRB on which R-PDCCH signals are mapped. In this manner, it is possible to avoid a degradation in accuracy of channel estimation. In other words, adopting this configuration enables adaptively selecting a degradation factor to be avoided, between "degradation in accuracy of channel estimation" and "decrease in transmission efficiency" while allowing for flexibility in configuration of the rank.

The embodiments of the claimed invention have been described above.

Other Embodiments (1) The abovementioned embodiments have been described regarding the cases where relay stations 200, 400 and 600 receive the R-PDCCH signals. However, the claimed invention is not limited to these cases, and the same effects obtained according to the claimed invention can be obtained when a mobile station (not illustrated) performs the same processing as relay stations 200, 400 and/or 600 upon reception of R-PDCCH signals transmitted from base stations 100, 300 and/or 500.

(2) In addition, the odd/even numbering of PRBs or RBGs in FIG. 11, FIG. 15, FIG. 18, and FIG. 19 of the abovementioned embodiments may be reversed.

(3) In addition, the abovementioned embodiments have been described regarding the case where two slots (i.e., first slot and second slot) are configured in a single PRB. However, each of the slots (first slot and second slot) may be defined as a single PRB and the first and second slots of a frequency according to a predetermined combination may be called a PRB pair.

(4) Each of the embodiments has been described with antennas, but the claimed invention can be applied to antenna ports in the same manner.

The term "antenna port" refers to a logical antenna including one or more physical antennas. In other words, the term "antenna port" does not necessarily refer to a single physical antenna, and may sometimes refer to an antenna array formed of a plurality of antennas, and/or the like.

For example, LTE does not specify the number of physical antennas forming an antenna port, but specifies an antenna port as a minimum unit allowing each base station to transmit different reference signals.

In addition, an antenna port may be specified as the minimum unit for multiplication of precoding vector weighting.

(5) The above-noted embodiments have been described by examples of hardware implementations, but the claimed invention can be also implemented by software in conjunction with hardware.

In addition, the functional blocks used in the descriptions of the embodiments are typically implemented as LSI devices, which are integrated circuits. The functional blocks may be formed as individual chips, or a part or all of the functional blocks may be integrated into a single chip. The term "LSI" is used herein, but the terms "IC," "system LSI," "super LSI" or "ultra LSI" may be used as well depending on the level of integration.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor, which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology and/or the like.

The disclosure of the specification, the drawings, and the abstract included in Japanese Patent Application No. 2011-035591, filed on Feb. 22, 2011, is incorporated herein by reference in its entirety.

INDUSTRIAL APPLICABILITY

The claimed invention is useful in that it improves the accuracy of channel estimation for PDSCH.

REFERENCE SIGNS LIST 100, 300, 500 Base station
200, 400, 600 Relay station
101, 113, 201, 212 Antenna 102, 202 Radio receiving section
103, 204 Demodulation section
104, 205 Error correction decoding section
105 R-PDCCH search space determining section 106, 208 Error correction coding section
107, 209 Modulation section
108, 210, 301, 501 Signal assignment section
109 Control signal coding section 110 Control signal assignment section
111, 502 Precoding section
112, 211 Radio transmitting section
203, 401, 601 Signal demultiplexing section
206 Blind-decoding determining section
207 R-PDCCH receiving section
1091 Aggregation size determining section
1092 Coding section
1101 R-PDCCH PRB determining section
1102 Assignment section

The invention claimed is:

1. A relay station in a communication system in which a base station and a mobile station communicate with each other via the relay station, the relay station comprising:
   a receiver that receives downlink control information and first reference signals, both being mapped in a first region of a Precoding Resource block Group (PRG), and receives downlink data and second reference signals, both being mapped in a second region of the PRG, from the base station, the PRG consisting of several resource blocks (RBs) and formed by dividing a frequency domain including a plurality of RBs, the several RBs in the PRG being consecutive in the frequency domain, the first region of the PRG being provided by a portion of one RB of the PRG, and the second region being provided by a remaining portion of the one RB and remaining RB(s) of the PRG; and
   a demodulator that demodulates the downlink data mapped in the second region using the second reference signals mapped in the second region, without using the first reference signals mapped in the first region.

2. The relay station according to claim 1, wherein
   the second region includes: a third region that is provided by the remaining portion of the one RB forming the first region; and a fourth region provided by the remaining RB(s) of the PRG, and
   the demodulator section demodulates the downlink data mapped in the third region, using the second reference signals mapped in the fourth region.

3. The relay station according to claim 1, wherein the downlink data is carried on a physical downlink shared channel (PDSCH).

4. The relay station according to claim 1, wherein the downlink data is mapped in the RB forming the first region.

5. The relay station according to claim 1, wherein the first region includes a single slot, and the downlink data is mapped in a slot that is subsequent to the single slot in the RB forming the first region.

6. The relay station according to claim 1, wherein the downlink data is mapped in the remaining portion of the one RB forming the first region, only in a case where the downlink control information mapped in the first region and the downlink data mapped in the second region are transmitted using the same precoding.

7. The relay station according to claim 1, wherein the downlink data mapped in the second region of the PRG is transmitted using the same precoding.

8. The relay station according to claim 1, wherein the second reference signals are used for channel estimation.

9. The relay station according to claim 1, wherein the demodulator acquires channel estimation values on a per RB basis from the second reference signals that are respectively mapped in the RBs of the PRG, and demodulates the downlink data using a value obtained by averaging the acquired channel estimation values.

10. A base station in a communication system in which the base station and a mobile station communicate with each other via a relay station, the base station comprising:
   a mapper that maps first reference signals and downlink control information in a first region of a precoding resource block (RB) group (PRG), and maps second reference signals and downlink data in a second region of the PRG, the PRG consisting of several resource blocks (RBs) and formed by dividing a frequency domain including a plurality of RBs, the RBs in the PRG being consecutive in the frequency domain, the first region of the PRG being provided by a portion of one RB of the PRG, and the second region being provided by a remaining portion of the one RB and remaining RB(s) of the PRG; and a transmitter that transmits the first reference signals and the control information mapped in the first region of the PRG and the second reference signals and the downlink data mapped in the second region of the PRG to the relay station, wherein the mapper maps the downlink data in the remaining portion of the one RB forming the first region.

11. A communication method in a communication system in which a base station and a mobile station communicate with each other via a relay station, the method comprising:

receiving, in the relay station, downlink control information and first reference signals, both being mapped in a first region of a Precoding Resource block Group (PRG), and downlink data and second reference signals, both being mapped in a second region of the PRG, from the base station the PRG consisting of several resource blocks (RBs) and formed by dividing a frequency domain including a plurality of RBs, the several RBs in the PRG being consecutive in the frequency domain, the first region of the PRG being provided by a portion of one RB of the PRG, and the second region being provided by a remaining portion of the one RB and remaining RB(s) of the PRG; and demodulating, in the relay station, the downlink data mapped in the second region using the second reference signals mapped in the second region, without using the first reference signals mapped in the first region.

* * * * *